United States Patent
Austria et al.

(10) Patent No.: US 11,675,349 B2
(45) Date of Patent: Jun. 13, 2023

(54) USER INTERFACE FOR REMOTE VEHICLE MONITORING

(71) Applicant: Zoox, Inc., Foster City, CA (US)

(72) Inventors: Auver Cedric Austria, San Francisco, CA (US); Timothy David Kentley-Klay, Stanford, CA (US); Jannie Wing Sze Lai, Berkeley, CA (US); Frank Reinaldo Ramirez, San Francisco, CA (US); Dennis Schaefer, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 247 days.

(21) Appl. No.: 17/107,570

(22) Filed: Nov. 30, 2020

(65) Prior Publication Data

US 2022/0171382 A1 Jun. 2, 2022

(51) Int. Cl.
G05D 1/00 (2006.01)

(52) U.S. Cl.
CPC ........... G05D 1/0016 (2013.01); G05D 1/005 (2013.01); G05D 1/0022 (2013.01); G05D 1/0027 (2013.01); G05D 1/0038 (2013.01)

(58) Field of Classification Search
CPC .. G05D 1/0016; G05D 1/0022; G05D 1/0027; G05D 1/0038; G05D 1/005
See application file for complete search history.

(56) References Cited

U.S. PATENT DOCUMENTS

| | | |
|---|---|---|
| D630,645 S | 1/2011 | Tokunaga et al. |
| D661,313 S | 6/2012 | Nenoki |
| D672,786 S | 12/2012 | Kay et al. |
| D681,048 S | 4/2013 | Freiberger |
| D767,609 S | 9/2016 | Mehrzad |
| D776,150 S | 1/2017 | Paulik |

(Continued)

FOREIGN PATENT DOCUMENTS

RU 2737080 C1 11/2020

OTHER PUBLICATIONS

How to start chat and make calls with Microsoft Teams—YouTube; https://www.youtube.com/watch?v=y7HXc3yWAlk; published: Aug. 20, 2019; #Microsoft #Microsoft365 #MicrosoftTeams (Year: 2019).*

(Continued)

*Primary Examiner* — Anne Marie Antonucci
*Assistant Examiner* — Jingli Wang
(74) *Attorney, Agent, or Firm* — Lee & Hayes, P.C.

(57) ABSTRACT

Techniques for providing a user interface for remote vehicle monitoring and/or control include presenting a digital representation of an environment and a vehicle as it traverses the environment on a first portion of a display and presenting on a second portion of the display a communication interface that is configured to provide communication with multiple people. The communication interface may enable communications between a remote operator and any number of occupants of the vehicle, other operators (e.g., other remote operators or in-vehicle operators), and/or people in an environment around the vehicle. The user interface may additionally include controls to adjust components of the vehicle, and the controls may be presented on a third portion of the display. Furthermore, the user interface may include a vehicle status interface that provides information associated with a current state of the vehicle.

20 Claims, 17 Drawing Sheets

(56) References Cited

U.S. PATENT DOCUMENTS

| | | | |
|---|---|---|---|
| D790,583 S | 6/2017 | Kay et al. | |
| D798,894 S | 10/2017 | Ibsies | |
| D814,489 S | 4/2018 | Ahmad et al. | |
| D828,844 S | 9/2018 | Nobuta et al. | |
| 10,837,788 B1 | 11/2020 | Kentley-Klay et al. | |
| 10,976,421 B2 | 4/2021 | Zhang et al. | |
| 2003/0147097 A1 | 8/2003 | Kotani et al. | |
| 2004/0250211 A1 | 12/2004 | Wakita et al. | |
| 2015/0193994 A1* | 7/2015 | McQuade | G07C 5/008 701/29.3 |
| 2017/0174228 A1* | 6/2017 | Baalu | B60K 37/06 |
| 2018/0223584 A1 | 8/2018 | Bradley et al. | |
| 2019/0019349 A1* | 1/2019 | Dolgov | G05D 1/0044 |

OTHER PUBLICATIONS

How To Open Individual Chat in Separate Windows in Microsoft Teams—ilovefreesoftwareTV, https://www.youtube.com/watch?v=qqPkKMAHSgs; May 24, 2020 (Year: 2020).*

International Search Report and Written Opinion for PCT Application No. PCT/US21/58648, dated Mar. 3, 2022.

"I Did It You Guise" Aug. 29, 2012, posted at deviantart.com, [site visited May 4, 2022]. https://www.deviantart.com/thecostumeninja/art/1-DID-IT-YOU-GU ISE-324144099 (Year: 2012), 1 page.

NDTV, "Where's The Lane? Self-Driving Cars Confused By Shabby US Roadways" Mar. 31, 2016, posted at ndtv.com, [site visited May 4, 2022]. https://www.ndtv.com/world-news/wheres-the-lane-self-driving-cars-confused-by-shabby-us-roadways-1292574 (Year: 2016), 1 page.

* cited by examiner

USER INTERFACE FOR REMOTE VEHICLE MONITORING

BACKGROUND

Fleets of vehicles are used to transport people or cargo from one location to another. Individual vehicles in the fleet of vehicles may be equipped with various sensors for generating data associated with the vehicle's surroundings. Sensor data may also be used for remote monitoring of the fleet of vehicles. In some cases, a remote operator may communicate with individual vehicles in the fleet of vehicles to provide instructions or information to the vehicles. However, it can be difficult to coordinate communications between and among multiple different vehicles and/or individuals.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 13 is a flowchart illustrating yet another example method of presenting a user interface on a display for the remote monitoring and/or controlling of a vehicle, as well as for presenting off-screen notifications on the user interface to indicate the presence of objects that the vehicle may be responding to.

DETAILED DESCRIPTION

Figure 1:
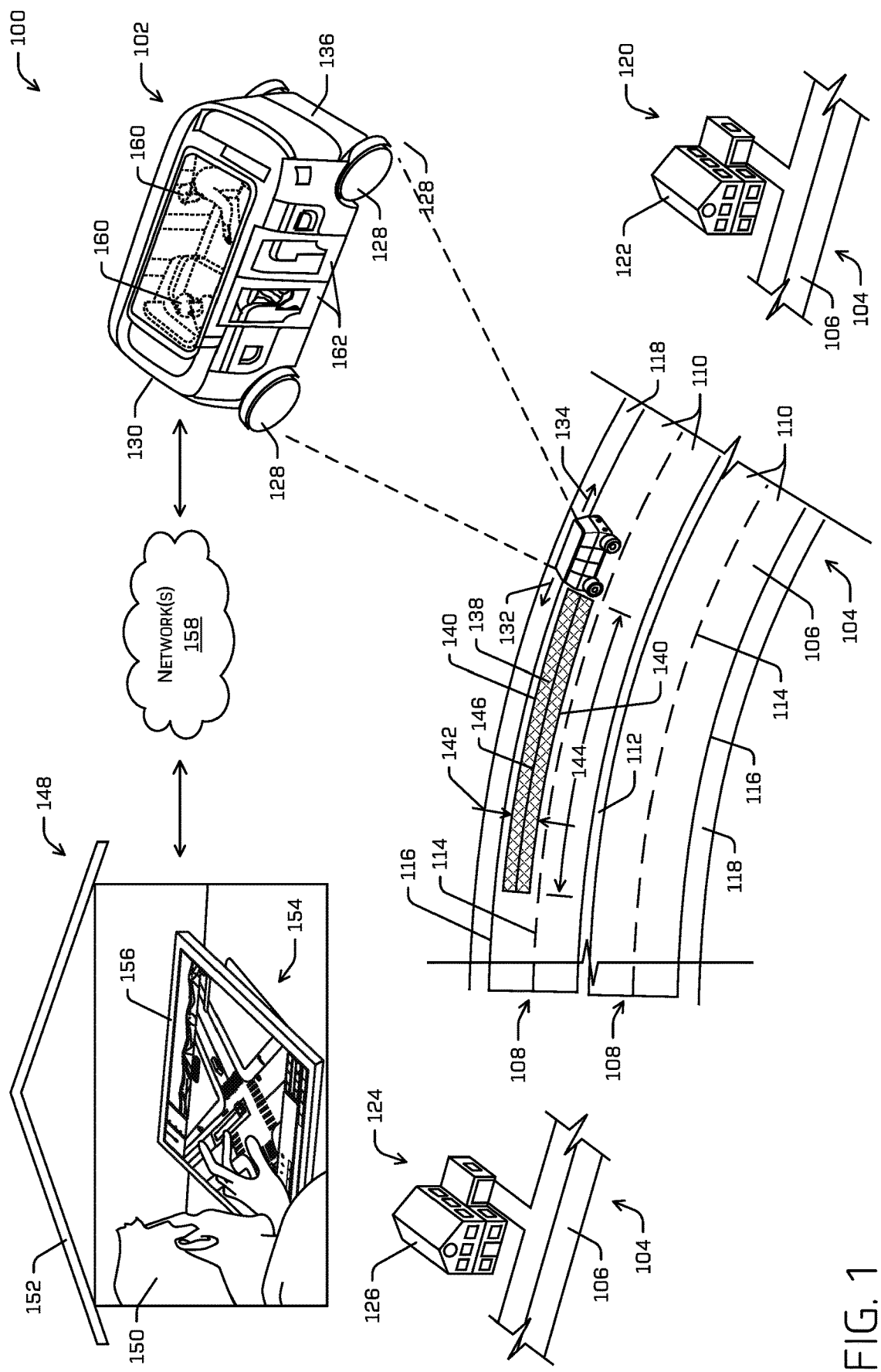
FIG. 1 illustrates a schematic diagram of an example environment through which an example vehicle travels while in communication with a teleoperations operator.

As discussed above, fleets of vehicles may be used to transport people or cargo from one location to another. Individual vehicles in the fleet of vehicles may be equipped with various sensors for generating data associated with the vehicle's surroundings. Sensor data may also be used for remote monitoring of the fleet of vehicles. In some cases, a remote operator may communicate with individual vehicles in the fleet of vehicles to provide instructions or information to the vehicles. However, it can be difficult to coordinate communications between and among multiple different vehicles and/or individuals. For instance, a remote operator may have to use different modalities (e.g., applications or devices) to communicate with different people and/or may be required to initiate separate communication sessions with different people (e.g., riders, operators, emergency services, etc.), which may be cumbersome and inefficient.

This application relates to an improved user interface for the remote monitoring, control, and/or communication with vehicles and individuals associated with a fleet of vehicles. In some examples, the user interface may provide a remote user (e.g., remote operator or "teleoperator") with information associated with a vehicle, such as a current state of the vehicle, a current geographic location of the vehicle, a current environment in which the vehicle is operating, and the like. For instance, based at least in part on data received from one or more sensors of a vehicle (e.g., LIDAR sensors, RADAR sensors, cameras, etc.), the user interface may cause presentation of a digital representation of an environment in which the vehicle is operating. The digital representation of the environment may include, for example, digital representations of the vehicle in the environment, other vehicles that are in the environment, pedestrians in the environment, a road network that the vehicle is navigating, traffic lights and/or traffic signage, and the like. Additionally, in some instances, the digital representation of the environment may include notifications of objects that are disposed outside of a field of view of the user interface but that will eventually enter the field of view. According to these techniques, the user interface may provide the remote user with an accurate and real-time or near real-time representation of the state of the vehicle, geographic location of the vehicle, and/or environment in which the vehicle is operating.

In some examples, the user interface may include a communication interface that enables the remote user to communicate with one or more occupants of the vehicle. For instance, the communication interface may enable the remote user to send messages to an occupant of the vehicle. The messages may include text messages that are sent to a device associated with the occupant (e.g., a mobile device of the user, a display screen in the vehicle associated with a seating location of the occupant in the vehicle, etc.). Additionally, or alternatively, the messages may include audio messages (e.g., voice messages, pre-recorded voice messages, 2-way voice communication, etc.) that are communicated audibly using one or more audio output devices of the vehicle (e.g., speakers).

In some examples the communication interface may enable the remote user to communicate with persons other than occupants of the vehicle, such as pedestrians who are proximate the vehicle, emergency services (e.g., 911 operators), other remote users, operators of the vehicle, and the like. For instance, a remote user may communicate directly with these and other persons via text messaging, 2-way voice communication, audio and/or visual communications (e.g., by causing a horn of the vehicle to honk or beep, causing lights of the vehicle to turn on or off, etc.), In this way, the user interface may provide the remote user communications with multiple different individuals and entities without requiring the remote user to maintain a separate application, instance, or device (e.g., cell phone, additional display screen, etc.).

In some examples, the user interface may include a vehicle control interface that is configured to provide the remote user with control of one or more components of the vehicle. For instance, the one or more components that may be remotely controllable by the remote user may include opening and closing of doors, opening and closing of windows, adjusting the temperature settings of the vehicle climate control system, adjusting a stereo system of the vehicle (e.g., adjusting volume, source of audio content, song selection, etc.), control of window shades, control of lighting, adjusting a vehicle ride setting (e.g., sport mode, comfort mode, etc.), and the like.

By way of example and not limitation, a method according to the various technologies described in this disclosure may include presenting, on a display, a user interface that is configured to provide a user with information associated with a vehicle. In some examples, the user may include a remote user (e.g., remote operator), and the vehicle may include a first vehicle of a fleet of vehicles (e.g., a plurality of vehicles).

In some examples, the user interface may include a first interface region that is presented on a first portion of the display. The first interface region may include a digital representation of an environment in which the vehicle is operating. For instance, sensor data may be captured by one or more sensor systems of the vehicle (e.g., LIDAR, RADAR, cameras, etc.) and, based at least in part on the sensor data, the user interface may cause presentation of the environment by processing the sensor data (e.g., by applying one or more rules and/or heuristics to the sensor data). In various examples the digital representation of the environment may include one or more digital representations of objects that are disposed within the environment, such as other vehicles, pedestrians, cyclists, structures (e.g., buildings), traffic lights and/or traffic signage, and the like. The one or more objects may be positioned within the digital representation of the environment at locations that correspond to their respective locations within the environment. In some examples, the first interface region may further include a digital representation of a road network that the vehicle is navigating, such as lane markings, junctions, road segments, and the like. For example, sensor data associated with the one or more objects, road network, etc. may be captured by the one or more sensor systems of the vehicle and the sensor data may be processed to generate the digital representation of the environment. Of course, in at least some examples, the sensor data itself may be transmitted as representations thereof. As non-limiting examples, such representations may comprise bounding boxes, contours, statistical distributions, etc., as well as any metrics associated therewith (e.g., certainties, ranges, etc.).

Additionally, in some examples the first interface region may include a digital representation of the environment as seen from one or more perspective viewpoints. For instance, a first perspective viewpoint may be a bird's eye perspective that includes the digital representation of the environment as well as a digital representation of the vehicle as it traverses the environment as seen from an aerial or third-person perspective viewpoint. The first perspective viewpoint may indicate a location of the vehicle within the environment. Additionally, or alternatively, a second perspective viewpoint may include a point of view perspective include the digital representation of the environment as seen from a perspective viewpoint of the vehicle itself (e.g., from a top center or front of the vehicle) or an occupant of the vehicle. The point of view perspective may be oriented forward (e.g., in a direction of travel of the vehicle), rearward (e.g., opposite a direction of travel of the vehicle), or to either lateral side of the vehicle. In some examples, the interface may include controls allowing the remote user to switch between different perspectives and/or choose from among multiple available perspectives including but not limited to those described herein.

In some examples, the user interface may include a second interface region that is presented on a second portion of the display. The second interface region may include a communication interface that is configured to provide the user communication with at least a first person. The first person may, in some examples, comprise a first occupant of the vehicle, a first operator of the vehicle, a first pedestrian that is proximate the vehicle, or another user (e.g., another remote teleoperator). Additionally, the communication interface may further be configured to provide communication with one or more additional persons, such as a second person, a third person, and so forth. For instance, if the first person comprises a first occupant of the vehicle, the one or more additional persons may include other occupant(s) of the vehicle, operator(s) of the vehicle, pedestrian(s) proximate the vehicle, another user(s), etc. Similarly, if the first person comprises a first pedestrian who is proximate the vehicle, the one or more additional persons may include occupant(s) of the vehicle, operator(s) of the vehicle, other pedestrian(s) proximate the vehicle, another user(s), etc.

In some examples, if a person or object that is being communicated with comprises a pedestrian or object that is disposed in the environment in which the vehicle is operating, an array of speakers may be used to emit directional sound to the particular pedestrian or object. For instance, U.S. application Ser. No. 15/986,739, which is incorporated herein by reference, describes communicating information to objects, including pedestrians, in environments of autonomous vehicles, and that autonomous vehicle can include acoustic arrays on an exterior surface of the autonomous vehicle to steer beams of acoustic energy (i.e., acoustic beam steering).

In some examples, one or more chat interfaces may be presented on the user interface. A chat interface of the one or more chat interfaces may be associated with a specific person, such as a first occupant of the vehicle or an operator of the vehicle. Additionally, or alternatively, a chat interface may be associated with a group of persons, such as a group of remote teleoperators, a group of occupants of the vehicle, and the like. Accordingly, the method may include receiving, via a first input element of the second interface region (e.g., communication interface), first data indicating that a first chat interface is to be opened. For instance, the first input element may be presented on the second portion of the display within the second interface region, and the first data may indicate that the first input element was selected by the user (e.g., pressed by the user on a touchscreen type display). The first input element may be associated with opening the first chat interface. Based at least in part on receiving the first data, the first chat interface may be presented on the display. In some examples, the first chat interface may be presented on the second portion of the display within the second interface region or the first chat interface may be presented on another portion of the display.

In various examples, messages that are to be communicated may be input and/or selected by the user. Types of messages that may be communicated may include text messages, recorded voice messages, pre-recorded voice messages, and/or text-to-voice messages. As such, the method may include receiving, via a second input element of the second interface region (e.g., communication interface), second data representing a first message that is to be sent. For instance, the second input element may comprise a text field input that is presented within at least one of the second interface region or the first chat interface. Further, the second data may comprise a string of text that is input by the user using the text field input. The string of text representing the first message may be sent as an SMS text message or may be converted to an audible message capable of being communicated audibly. Additionally, or alternatively, the second data may comprise a recorded voice message or a pre-recorded voice message.

In some examples, the first message may be presented on the display within the first chat interface based at least in part on receiving an indication that the first message is to be sent. For example, the indication that the first message is to be sent may be received via an input element that is associated with sending the message (e.g., a "send" input element). The input element that is associated with sending the message may, in some examples, be presented within at least one of the second interface region or the first chat interface. Additionally, presenting the first message within the first chat interface may indicate that the first message was sent to the first person.

In some examples, messages that are sent to the user from the first person may be presented on the display within the first chat interface. For instance, the first chat interface may be associated with the first person, and the first chat interface may present a history of messages sent between the user and the first person. Thus, the method may include receiving, via a network and from a first device associated with the first person, data representing a first response to the first message and presenting, on the display and within the first chat interface, the first response to the first message.

Additionally, or alternatively, and as noted above, a chat interface may be associated with a group of persons, such as a group of remote teleoperators, a group of occupants of the vehicle, and the like. In a group chat interface, presenting a message that was sent to the user by the first person or the second person may include presenting the message and an identifier that indicates the person who sent the message. The identifier may, for instance, include a photo of the person, a name of the person, the person's initials, and the like. Thus, the method may further include receiving a first response message from the first person and presenting, on the display and within the group chat interface, the first response message including a first identifier that is associated with the first person. Additionally, the method may include receiving a second response message from the second person and presenting, on the display and within the group chat interface, the second response message including a second identifier that is associated with the second person.

In some examples, suggested messages may be presented to the user based at least in part on portions of messages that are being input by the user (e.g., predicted text). For instance, if the user is typing a message that starts with the word "please," one or more suggested messages may be presented to the user, such as "please buckle your seatbelt," "please allow the doors to close," "please wear a face covering if you feel sick," and the like. In some examples, the suggested messages may additionally or alternatively be based on a semantic meaning of the portion(s) of the message entered, a past, present or planned state of the vehicle (e.g., moving, stationary, picking up a passenger, dropping off a passenger, etc.), a history of communications with the intended recipient of the message, and the like. In this way, the user inputting the message may select one of the suggested messages thereby simplifying and speeding the process of composing the message. As such, the method may further include receiving, via the second input element of the second interface region (e.g., communication interface), data representing a first portion of a message that is to be communicated and determining, based at least in part on the data, one or more suggested messages that are associated with the first portion of the message. Additionally, the method may include presenting at least a first suggested message of the one or more suggested messages on the display and based at least in part on receiving an indication that the first suggested message is to be sent, presenting the first suggested message on the display within the first chat interface.

Additionally, in some instances contextual clues may be presented on the user interface and suggested messages may be presented to the remote user that are associated with a contextual clue. For example, if an occupant of the vehicle is not wearing their seatbelt an indicator may be presented on the user interface to notify the remote user that the occupant is not wearing their seatbelt. Additionally, a suggested message to send to the occupant (e.g., telling the occupant to buckle their seatbelt) may be presented on the user interface so that the remote user may communicate the request to the occupant.

In some examples, the user interface may include a third interface region that is presented on a third portion of the display. The third interface region may comprise a vehicle status interface that is configured to provide the user with information associated with a state of the vehicle. In some examples, the information may include one or more of a current speed of the vehicle, a direction of travel of the vehicle (e.g., a trajectory of the vehicle), a traffic rule associated with a current route of the vehicle (e.g., whether the vehicle is at a stop sign, a speed limit sign associated with the current location or route, etc.), status messages of one or more components of the vehicle (e.g., whether the component is in a failed state, needs servicing, error messages, voltages, currents, temperatures, etc.), and the like. The vehicle status interface and/or the third interface region may be disposed on or within the first interface region proximate the digital representation of the vehicle (e.g., above, below, to the side, etc. of the vehicle). Additionally, the vehicle status interface may increase in size and decrease in size (e.g., expand and contract) based at least in part on a current state of the vehicle, such as how many traffic rules are present on a current route of the vehicle. The changing size of the vehicle status interface is discussed in further detail below in FIGS. 10A and 10B.

In various examples, the user interface may enable the user to control one or more components of the vehicle. For instance, the user interface may include a fourth interface region that is presented on a fourth portion of the display. The fourth interface region may comprise a vehicle control interface that is configured to provide the user with control of one or more components of the vehicle. The vehicle control interface may include one or more input elements that are associated with controlling one or more components of the vehicle. The one or more components of the vehicle may include doors of the vehicle, windows of the vehicle, a climate control system of the vehicle, a stereo system of the vehicle, lighting of the vehicle, window shades of the vehicle, a ride setting of the vehicle, and the like.

In some examples, data indicating that a first component of the vehicle is to be controlled may be received via a first input element of the vehicle control interface. Based at least in part on the data, one or more additional input elements may be presented on the display. The one or more additional input elements may be associated with controlling the first component of the vehicle. For instance, if the component to be controlled comprises the doors of the vehicle, the one or more additional input elements may include a first additional input element for closing a first door, a second additional input element for opening the first door, a third additional input element for closing a second door, a fourth additional input element for opening the second door, and so on.

In some examples, the method may include receiving, via a first additional input element, data indicating that a state of the first component is to be changed from a first state to a second state. For instance, if the first component comprises a door of the vehicle, the first state may correspond with the door being opened and the second state may correspond with the door being closed. In some examples, based at least in part on receiving the data indicating that the state of the component is to be changed, the method may include causing the state of the component to change from the first state to the second state (e.g., causing the door to transition from the opened position to the closed position).

Additionally, based at least in part on the state of the first component of the vehicle corresponding with the second state, the digital representation of the vehicle may be updated to indicate that the first component is in the second state. For instance, if the first component comprises a door of the vehicle and the first state corresponds with the door of the vehicle being opened, then the digital representation of the vehicle may initially illustrate the vehicle with the door being opened. However, after the door of the vehicle is closed (second state), the digital representation of the vehicle may be updated to illustrate that the door of the vehicle is closed.

In some examples, the user interface may present indications of objects that are located within the environment but outside a field of view presented on the display, and/or objects that are located within the environment but occluded by other objects in the environment. For instance, if an object (e.g., pedestrian, cyclist, other vehicle, etc.) is approaching the vehicle, but the object is not presented on the display because it is outside the field of view, the user interface may present an indication on the display that shows the direction from which the object is approaching. Thus, the method may include receiving sensor data representative of one or more objects disposed within another field of view of the environment that is outside of the first field-of-view and/or occluded by an object within the environment when viewed from the first field-of-view. In some examples, based at least in part on processing the sensor data, a direction of travel (e.g., trajectory) that is associated with an object of the one or more objects may be determined. Additionally, or alternatively, a period of time may be determined that is associated with the object moving into the field of view. The period of time may be determined, in some instances, based at least in part on the sensor data and/or based at least in part on the direction of travel. In some examples, an indication that the first object is about to enter the first field-of-view may be presented on the display. Presenting the indication may be based at least in part on the sensor data, the direction of travel associated with the object, and or the period of time being less than a threshold period of time.

These and other aspects are described further below with reference to the accompanying drawings. The drawings are merely example implementations and should not be construed to limit the scope of the claims. For example, while the example vehicles are shown and described as being autonomous vehicles that are capable of navigating between locations without human control or intervention, techniques described herein are also applicable to non-autonomous and/or semi-autonomous vehicles. Also, while the vehicle is illustrated as having a coach style body module with seats facing one another toward a center of the vehicle, other body modules are contemplated. Body modules configured to accommodate any number of one or more occupants (e.g., 1, 2, 3, 4, 5, 6, 7, 8, etc.) are contemplated. Additionally, while the example body modules shown include a passenger compartment, in other examples the body module may not have a passenger compartment (e.g., in the case of a cargo vehicle, delivery vehicle, construction vehicle, etc.).

Example Vehicle Monitoring Architecture

FIG. 1 illustrates a schematic diagram of an example environment 100 through which an example vehicle 102 travels. The example environment 100 includes a road network 104 including a plurality of example roads 106 having two pairs 108 of lanes 110 separated by a median or double-yellow line 112, with each of the lanes 110 of a pair 108 of lanes 110 defined by a lane dividing line 114 and lane boundary lines 116. The example road 106 also includes shoulders 118 located on opposite sides of the road 106. FIG. 1 also shows an example geographic location 120 associated with a departure location including a structure 122, such as a house or building, and an example destination 124 also including a structure 126, such as a house or building. The road network 104 provides a number of roads 106 defining a path between the geographic location 120 and the destination 124, and FIG. 1 shows an enlarged view of a portion of an example road 106. The road network 104 may include a number of features, such as curves, intersections with cross-roads, crosswalks, traffic signs, traffic lights, railroad crossings, traffic circles, directional arrows, etc.

As shown in FIG. 1, the example vehicle 102 may travel through the example environment 100 via the road network 104 according to a path from the geographic location 120 to the destination 124. For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 shown in FIG. 1 is an automobile having four wheels 128 and respective tires for each of the wheels 128. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels 128, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end 130 of the vehicle 102 is a front end of the vehicle 102 when travelling in a first direction 132, and such that the first end 130 becomes the rear end of the vehicle 102 when traveling in the opposite, second direction 134, as shown in FIG. 1. Similarly, a second end 136 of the vehicle 102 is a front end of the vehicle 102 when travelling in the second direction 134, and such that the second end 136 becomes the rear end of the vehicle 102 when traveling in the opposite, first direction 132. Such a configuration may be referred to herein as "bidirectionality." These example bidirectional characteristics may facilitate greater maneuverability, for example, in small spaces or crowded environments, such as parking lots and urban areas.

In the example shown in FIG. 1, the vehicle 102 may use various sensors and a vehicle controller to autonomously operate through the environment 100 along the path via the road network 104. For example, the vehicle controller may be configured to determine a driving corridor 138 defined by virtual boundaries 140 within which the vehicle 102 may travel. For example, the driving corridor 138 may have a variable corridor width 142 in the width direction of the vehicle 102, and a variable corridor length 144 extending in the direction of travel of the vehicle 102. In some examples, the virtual boundaries 140 of the driving corridor 138 may be determined based at least in part on sensor data received from sensors associated with the vehicle 102 and/or road network data received by the vehicle 102 via a road network data store, as explained in more detail herein. Though not illustrated in FIG. 1, such sensor data indicative of objects may be represented in such a corridor as indented or removed portions. In some examples, the vehicle 102 may travel along a drive line 146 within the driving corridor 138.

In some examples, the vehicle 102 may operate autonomously until the vehicle 102 encounters an event along the road 106 for which it may request assistance from, for example, a teleoperations system 148 located remotely from the vehicle 102. For example, the vehicle 102 may encounter a construction zone associated with a portion of the path, and traffic in the vicinity of the construction zone may be under the direction of a construction worker who provides instructions for traffic to maneuver around the construction zone. Due in part to the unpredictable nature of this type of event, the vehicle 102 may request remote assistance from the teleoperations system 148. However, interaction between the vehicle 102 and the teleoperations system 148 is not limited to an event, and the vehicle 102 and teleoperations system 148 may interact for a number of reasons, such as to communicate directly with an occupant of the vehicle 102, to communicate with pedestrians proximate the vehicle 102, to control components of the vehicle 102, and the like. In some examples, the vehicle 102 may be a part of a fleet of vehicles in communication with the teleoperations system 148 via one or more communications networks 158, as explained in more detail herein.

In some examples, for example as shown in FIG. 1, the teleoperations system 148 may include one or more teleoperators 150, which may be human teleoperators located at a teleoperations center 152 or other remote location(s). In some examples, one or more of the teleoperators 150 may not be human. For example, they may be computer systems leveraging artificial intelligence, machine learning, and/or other decision-making strategies. In the example shown, the teleoperator 150 may interact with one or more vehicles 102 in the fleet of vehicles via a teleoperator interface 154. The teleoperator interface 154 may include one or more displays 156 configured to provide the teleoperator 150 with data related to operation of the vehicle 102, a subset of the fleet of vehicles, and/or the fleet of vehicles. For example, the display(s) 156 may be configured to show data related to sensor signals received from the vehicles 102, data related to the road network 104, and/or additional data or information to facilitate providing assistance to the vehicles 102. In addition, the teleoperator interface 154 and/or the one or more displays 156 may also include a teleoperator input device configured to allow the teleoperator 150 to provide information to one or more of the vehicles 102, for example, in the form of teleoperations signals providing guidance to the vehicles 102. The teleoperator input device may include one or more of a touch-sensitive screen, a stylus, a mouse, a dial, a keypad, and/or a gesture-input system configured to translate gestures performed by the teleoperator 150 into input commands for the teleoperator interface 154. As explained in more detail herein, the teleoperations system 148 may provide one or more of the vehicles 102 with guidance to avoid, maneuver around, or pass through events.

In some examples, in order to provide the teleoperator 150 with information and/or data associated with one or more vehicles, the teleoperator interface 154 may present a user interface on the one or more displays 156. The user interface may include a digital representation of an environment in which the vehicle is operating, such as the environment 100. For instance, the digital representation of the environment 100 may include, in some examples, digital representations of the vehicle 102, the road network 104, including the roads 106, lanes 110, median or double-yellow line 112, dividing line 114, and lane boundary lines 116. Additionally, the digital representation of the environment 100 may also include digital representations of structures, such as structures 122 and 126, other vehicles, pedestrians, motorists, traffic lights and/or traffic signage, and the like. Additionally, in some instances, the user interface may present notifications of objects (e.g., other vehicles, pedestrians, etc.) that are disposed outside of a field of view shown on the display 156 but that will eventually enter the field of view.

In some examples, the user interface may include a communication interface that is presented on the one or more displays 156 to enable the teleoperator 150 to communicate with one or more occupants 160 of the vehicle 102. For instance, the communication interface may enable the teleoperator 150 to send messages to an occupant 160 of the vehicle 102. The messages may include SMS text messages that are sent to a device associated with the occupant 160, such as a mobile device of the occupant 160, a display screen of the vehicle 102 that is associated with a seat occupied by the occupant 160, etc. Additionally, or alternatively, the messages may include audio messages (e.g., voice messages, pre-recorded voice messages, two-way voice communications, etc.) that are communicated audibly using one or more devices of the vehicle 102 capable of audio output (e.g., speakers of the vehicle, display screens of the vehicle, etc.), a device associated with the occupant 160, and the like. Additionally, or alternatively, in some examples the communication interface may enable the remote user to communicate directly or indirectly with any one of pedestrians who are proximate the vehicle, third parties (e.g., 911 operators, first responders, etc.), other remote users, operators of the vehicle, and the like. In even further examples, the communication interface may enable the teleoperator 150 to send files to the occupant 160, such as images, videos, documents, and the like.

In some examples, the communication interface may enable a teleoperator 150 to communicate with an occupant 160 of the vehicle 102 using multiple languages. For instance, the communication interface may include a language translation feature for translating, from a first spoken language to a second spoken language, text messages and/or audio messages received from the occupant 160. Additionally, the language translation feature may translate, from a first spoken language to a second spoken language, text messages and/or audio messages that the teleoperator 150 is trying to send to the occupant 160. The language translation feature may be capable of translating any number of spoken languages (e.g., English, Spanish, Mandarin Chinese, Arabic, Hindi, German, French, Italian, Russian, etc.) to allow the teleoperator 150 to communicate with the occupant 160, regardless of what languages are spoken or understood by either party. Additionally, the communication interface may utilize natural language processing for speech-to-text conversion. In this way, spoken voice messages may be converted to text messages and vice-versa to enable the teleoperator 150 and the occupant 160 to communicate hands-free. Further, text messages may be converted to computerized speech so that a user may audibly listen to a written text message.

In some examples, the user interface may include a vehicle control interface that is configured to provide the teleoperator 150 with control of one or more components of the vehicle 102, such as the doors 162. For instance, the vehicle control interface of the user interface may allow the teleoperator 150 to open and close the doors 102 of the vehicle 102, lock the doors 102, and the like. Additionally, the vehicle control interface may, in some examples, allow the teleoperator 150 to adjust and/or control a variety of components of the vehicle 102, including the ability to open and close windows, adjust ambient temperature settings (e.g., activate the heater or air conditioning), adjust a stereo system (e.g., adjusting volume, song selection, etc.), adjust window shades, control windshield wipers, control headlights, and the like.

Figure 2:
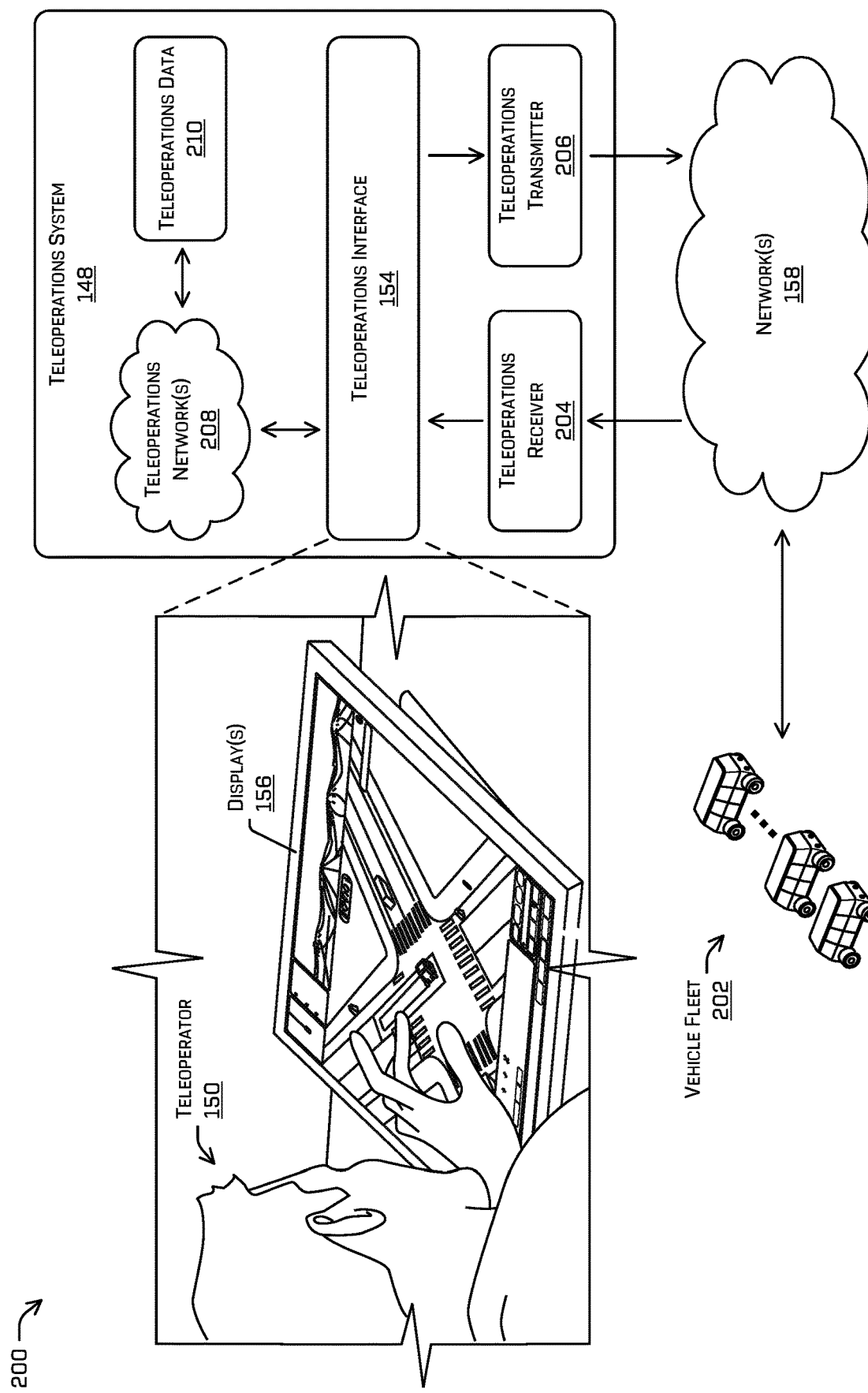
FIG. 2 illustrates a schematic and block diagram showing example detail of a teleoperations system for remotely monitoring a fleet of vehicles.

FIG. 2 illustrates an example architecture 200 including an example teleoperations system 148 for remotely monitoring a fleet of vehicles 202. The example fleet of vehicles 202 includes a plurality of vehicles 102, at least some which are communicatively coupled to the teleoperations system 148, for example, via the network(s) 158 and a teleoperations receiver 204 and a teleoperations transmitter 206 associated with the teleoperations system 148. For example, a vehicle 102 may send communication signals via a network interface of the vehicle 102, which are received by the teleoperations receiver 204. In some examples, the communication signals may include, for example, sensor data from sensor signals generated by one or more sensors associated with the vehicle 102 (and/or representations thereof), and/or road network data from a road network data store. In some examples, the sensor data may include raw sensor data or processed sensor data, and the road network data may include data related to a global or local map of an area associated with operation of the vehicle 102. In some examples, the communication signals may include data associated with the current status of the vehicle 102 and its systems, such as, for example, its current position, current speed, current path and/or trajectory, current occupancy, status of one or more components and/or subcomponents, messages (e.g., messages transmitted between any component and/or subcomponent), the level of charge of one or more of its batteries, and/or the operational status of its sensors and drive systems. In some examples, the communication signals from the vehicle 102 may include a request for information from the teleoperations system 148. Such information, may include, for example, assistance with operation of the vehicle 148 in the form of, for example, information about objects, the road network 104, the road 106, the global map, the local map, collaboration with respect to vehicle operations and maneuvers, and/or confirmation of information and/or actions proposed by the vehicle 102.

Figure 3:
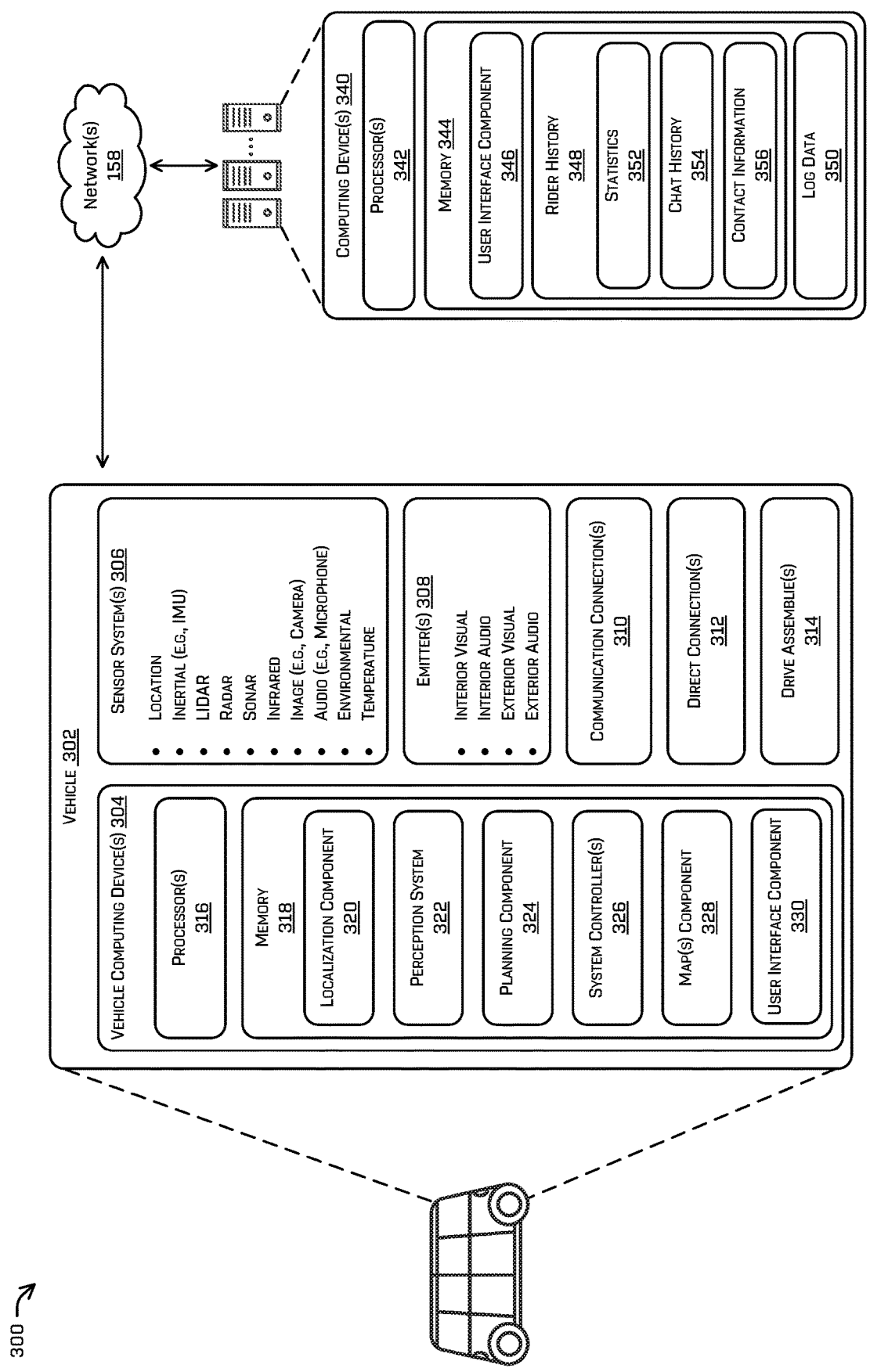
FIG. 3 is a block diagram illustrating an example system for implementing some of the various technologies described herein.

As shown in FIG. 3, the teleoperations receiver 204 may be communicatively coupled to the teleoperations interface 154, and in some examples, the teleoperator 150 may be able to access the sensor data, the road network data, and/or any other data in the communication signals received from a vehicle 102 via the teleoperations interface 154. In some examples, the teleoperator 150 may be able to selectively access the sensor data, road network data, and/or other data using the teleoperations interface 154 and view the selected data via one or more of the displays 156. In some examples, the displays 156 may display digital representations, simplistic pictorial representations, animations, bounding boxes, arrows indicating a bearing and/or velocity of objects, icons representing objects, colorization of the sensor data, and/or other representations of the data, which may simplify interpretation by a teleoperator 150. In some examples, the displays 156 may additionally or alternatively display raw sensor data (e.g., camera images, lidar point clouds, etc.).

In the example shown, the teleoperations system 148 also includes a teleoperations network 208 that is configured to provide communication between two or more of the teleoperations interfaces 154 and the respective teleoperators 150, and/or communication with teleoperations data 210. For example, the teleoperations system 148 may include a plurality of teleoperations interfaces 154 and respective teleoperators 150, and the teleoperators 150 may communicate with one another via the teleoperations network 208 to facilitate and/or coordinate the guidance provided to the vehicles 102 of the fleet 302. For instance, the teleoperations interface 154 may present a user interface on the displays 156 that includes a communication interface for teleoperators 150 to communicate with other teleoperators 150, occupants 160 of the vehicles 102, pedestrians proximate a vehicle 102 of the vehicle fleet 202, and the like. In some examples, there may be a teleoperator 150 assigned to each of the vehicles 102, and in some examples, a teleoperator 150 may be assigned to more than a single vehicle 102 of the fleet of vehicles 202. In some examples, more than one teleoperator 150 may be assigned to a single vehicle 102. In some examples, teleoperators 150 may not be assigned to specific vehicles 102 of the vehicle fleet 202, but may instead provide guidance to vehicles 102 that have encountered certain types of events and/or to vehicles 102 based on, for example, a level of urgency associated with the vehicle's encounter with the event. In some examples, data associated with an event and/or the guidance provided by a teleoperator 150 may be stored by the teleoperations system 148, for example, in storage for the teleoperations data 210, and/or accessed by other teleoperators 150.

In some examples, the teleoperation data 210 may be accessible by the teleoperators 150, for example, via the teleoperations interface 154, for use in providing guidance to the vehicles 102. For example, the teleoperations data 210 may include global and/or local map data related to the road network 104, events associated with the road network 104, and/or travel conditions associated with the road network 104 due to, for example, traffic volume, weather conditions, construction zones, and/or special events. In some examples, the teleoperations data 210 may include data associated with one more of the vehicles 102 of the vehicle fleet 202, such as, for example, maintenance and service information, and/or operational history including, for example, event history associated with the vehicle 102, path histories, occupancy histories, and other types of data associated with the vehicle 102.

FIG. 3 is a block diagram illustrating an example system 300 for implementing some of the various technologies described herein. In some examples, the system 300 may include one or multiple features, components, and/or functionality of examples described herein with reference to other figures, such as FIGS. 1, 2, 4, etc.

The system 300 may include a vehicle 102. In some examples, the vehicle 302 may include some or all of the features, components, and/or functionality described above with respect to vehicle 102. For instance, the vehicle 302 may comprise a bidirectional vehicle. As shown in FIG. 3, the vehicle 302 may also include a vehicle computing device 304, one or more sensor systems 306, one or more emitters 308, one or more communication connections 310, one or more direct connections 312, and/or one or more drive assemblies 314.

The vehicle computing device 304 can, in some examples, include one or more processors 316 and memory 318 communicatively coupled with the one or more processors 316. In the illustrated example, the vehicle 302 is an autonomous vehicle; however, the vehicle 302 could be any other type of vehicle (e.g., automobile, truck, bus, aircraft, watercraft, train, etc.), or any other system having components such as those illustrated in FIG. 3 (e.g., a robotic system, an automated assembly/manufacturing system, etc.). In examples, the one or more processors 316 may execute instructions stored in the memory 318 to perform one or more operations on behalf of the one or more vehicle computing devices 304.

The memory 318 of the one or more vehicle computing devices 304 stores a localization component 320, a perception system 322, a planning component 324, one or more system controllers 326, a map(s) component 328, a monitoring component 330, a filtering component 332, and a user interface component 334. Though depicted in FIG. 3 as residing in memory 318 for illustrative purposes, it is contemplated that the localization component 320, perception system 322, planning component 324, one or more system controllers 326, map(s) component 328, monitoring component 330, filtering component 332, and/or user interface component 334, can additionally, or alternatively, be accessible to the vehicle 302 (e.g., stored on, or otherwise accessible from, memory remote from the vehicle 302, such as memory 344 of one or more computing devices 340).

In at least one example, the localization component 320 can include functionality to receive data from the sensor system(s) 306 to determine a position and/or orientation of the vehicle 302 (e.g., one or more of an x-, y-, z-position, roll, pitch, or yaw). For example, the localization component 320 can include and/or request/receive a map of an environment and can continuously determine a location and/or orientation of the autonomous vehicle within the map. In some instances, the localization component 320 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 306 or received from one or more other devices (e.g., computing devices 340) to accurately determine a location of the autonomous vehicle. In some instances, the localization component 320 can provide data to various components of the vehicle 302 to determine an initial position of the autonomous vehicle for generating a trajectory and/or for determining to retrieve map data. In various examples, the localization component 320 can provide data to the teleoperations system 148, and the teleoperations system 148 may present, on a display 156, a position of the vehicle 302 with respect to an environment in which the vehicle 302 is traversing.

In some instances, the perception system 322 can include functionality to perform object tracking, detection, segmentation, and/or classification. In some examples, the perception system 322 can provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional and/or alternative examples, the perception system 322 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception system 322 may provide data to the teleoperations system 148, and the teleoperations system 148 may present, on a display 156, a digital representation of one or more objects that are disposed in the environment that the vehicle is traversing.

In general, the planning component 324 can determine a path for the vehicle 302 to follow to traverse through an environment. For example, the planning component 324 can determine various routes and trajectories and various levels of detail. For example, the planning component 324 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 324 can generate an instruction for guiding the autonomous vehicle along at least a portion of the route from the first location to the second location. In at least one example, the planning component 324 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 302 to navigate.

In at least one example, the vehicle computing device 304 can include one or more system controllers 326, which can be configured to control steering, propulsion, braking, safety, emitters, communication, components, and other systems of the vehicle 302. These system controller(s) 326 can communicate with and/or control corresponding systems of the drive assembly(s) 314 and/or other components of the vehicle 302.

The memory 318 can further include the map(s) component 328 to maintain and/or update one or more maps (not shown) that can be used by the vehicle 302 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 302 can be controlled based at least in part on the maps. That is, the maps can be used in connection with the localization component 320, the perception system 322, and/or the planning component 324 to determine a location of the vehicle 302, identify objects in an environment, and/or generate routes and/or trajectories to navigate within an environment.

In some examples, the one or more maps can be stored on a remote computing device(s) (such as the computing device(s) 340) accessible via network(s) 158. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 318 may also store a user interface component 330. The user interface component 330 may generate a user interface that is associated with the vehicle 302. In some instances, the user interface may be presented on a display that is associated with the vehicle (e.g., affixed to the interior of the vehicle, in communication with the vehicle over, for instance, a Bluetooth or other short range communication network, etc.) such that occupants of the vehicle may view the user interface. Additionally, or alternative, the user interface may be presented on a display of a user's and/or occupant's smartphone, tablet, or personal computer. The user interface component 330 may receive data from the various components and/or sensors of the vehicle 302 and use that data to generate a digital representation of the vehicle 302 as it traverses an environment. For instance, the user interface component 3330 may receive data from the perception system 322 and/or raw data from the various sensor systems 306 and use that data to generate a digital representation of other vehicles, pedestrians, cyclists, structures, and the like that are disposed in the environment.

In some instances, aspects of some or all of the memory-stored components discussed herein can include any models, algorithms, and/or machine learning algorithms. For example, in some instances, components in the memory 318 (and the memory 344, discussed in further detail below) such as the perception system 322, planning component 324, monitoring component 330, and filtering component 336 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 306 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 306 can include multiple instances of each of these or other types of sensors. For instance, the lidar sensors can include individual lidar sensors located at the corners, front, back, sides, and/or top of the vehicle 302. As another example, the image sensors can include multiple image sensors disposed at various locations about the exterior and/or interior of the vehicle 302. As an even further example, the audio sensors can include multiple audio sensors disposed at various locations about the exterior and/or interior of the vehicle 302. Additionally, the audio sensors can include an array of a plurality of audio sensors for determining directionality of audio data. The sensor system(s) 306 can provide input to the vehicle computing device 304. Additionally, or alternatively, the sensor system(s) 306 can send sensor data, via the one or more networks 158, to the one or more computing device(s) 340 at a particular frequency, after a lapse of a predetermined period of time, in near real-time, etc.

The vehicle 302 can also include one or more emitters 308 for emitting light and/or sound. The emitters 308 in this example include interior audio and visual emitters to communicate with passengers of the vehicle 302. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive assembly(s) 314. Also, the communication connection(s) 310 can allow the vehicle 302 to communicate with other nearby computing device(s) (e.g., other nearby vehicles, traffic signals, etc.). The communications connection(s) 310 also enable the vehicle 302 to communicate with the remote teleoperations system 148 or other remote services.

The communications connection(s) 310 can include physical and/or logical interfaces for connecting the vehicle computing device(s) 304 to another computing device (e.g., computing device(s) 340) and/or a network, such as network(s) 158. For example, the communications connection(s) 310 can enable Wi-Fi-based communication such as via frequencies defined by the IEEE 702.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 312 of vehicle 302 can provide a physical interface to couple the one or more drive assembly(s) 314 with the body of the vehicle 302. For example, the direct connection 312 can allow the transfer of energy, fluids, air, data, etc. between the drive assembly(s) 314 and the vehicle 302. In some instances, the direct connection 312 can further releasably secure the drive assembly(s) 314 to the body of the vehicle 302.

In at least one example, the vehicle 302 can include one or more drive assemblies 314. In some examples, the vehicle 302 can have a single drive assembly 314. In at least one example, if the vehicle 302 has multiple drive assemblies 314, individual drive assemblies 314 can be positioned on opposite longitudinal ends of the vehicle 302 (e.g., the leading and trailing ends, the front and the rear, etc.).

The drive assembly(s) 314 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 314 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 314. Furthermore, the drive assembly(s) 314 may also include one or more communication connection(s) that enable communication by the respective drive assembly with one or more other local or remote computing device(s).

The computing device(s) 340 can include one or more processors 342 and memory 344 that may be communicatively coupled to the one or more processors 342. The memory 344 may store a user interface component 346, a rider history component 348, and log data 350. In some examples, the computing device(s) 340 may be associated with the teleoperations system 148 described in FIGS. 1 and 2. For instance, the computing device(s) 340 may represent a display 156 of the teleoperations interface 154 of the teleoperations system 148. Additionally, or alternatively, the computing devices(s) 340 may be leveraged by the teleoperations system 148 to receive and/or process data on behalf of the teleoperations system 148.

The user interface component 346 may generate a user interface that is associated with the vehicle 302. The user interface may be presented to a device associated with a teleoperator such that the teleoperator may remotely monitor the vehicle 302. For instance, while the vehicle 302 may be operating in a first geographic location (e.g., San Jose), the remote teleoperator may be monitoring the vehicle 302 from a second geographic location (e.g., Los Angeles). The user interface component 346 may receive data over the network 158 from the various components and/or sensors of the vehicle 302 and use that data to generate a digital representation of the vehicle 302 as it traverses an environment. For instance, the user interface component 346 may receive data from the perception system 322 and/or raw data from the various sensor systems 306 and use that data to generate a digital representation of other vehicles, pedestrians, cyclists, structures, and the like that are disposed in the environment.

The rider history component 348 may store various data associated with riders of the vehicle 302 (e.g., current and or previous vehicle occupants), such as occupants 160. In some examples, the rider history component 348 stores statistics 352 associated with each rider, a chat history 354 associated with each rider, and/or contact information 356 associated with each rider. The rider statistics 352 may include, for instance, a rating associated with the rider, a trip frequency associated with the rider, a total amount of miles the rider has traveled, a dollar amount the rider has spent, and the like. In some examples, the chat history component 354 may store a history of all correspondence between riders and teleoperators. For instance, using the user interface, a teleoperator may communicate with the rider, as discussed in further detail below. The content of these communications may be logged by the chat history component 354. Additionally, contact information 356 for each rider may be stored for future use. Contact information 356 for a rider may include, in some examples, a phone number associated with a rider's device (e.g., cell phone), an email address associated with the rider, an account associated with the rider, and the like.

In some examples, the memory 344 may include log data 350. The log data 350 may store one or more notes created by a teleoperator using the user interface. For instance, if an anomaly is present in the vehicle 302, the teleoperator may desire to take note of the anomaly for future reference and/or diagnostics. Accordingly, the log data 350 may store such notes created by the teleoperator.

The processor(s) 316 of the vehicle 302 and the processor(s) 342 of the computing device(s) 340 can be any suitable processor capable of executing instructions to process data and perform operations as described herein. By way of example and not limitation, the processor(s) 316 and 342 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 344 are examples of non-transitory computer-readable media. The memory 318 and 344 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 3 is illustrated as a distributed system, in alternative examples, components of the vehicle 302 can be associated with the computing device(s) 340 and/or components of the computing device(s) 340 can be associated with the vehicle 302. That is, the vehicle 302 can perform one or more of the functions associated with the computing device(s) 340, and vice versa.

Example User Interface Technologies

Figure 4:
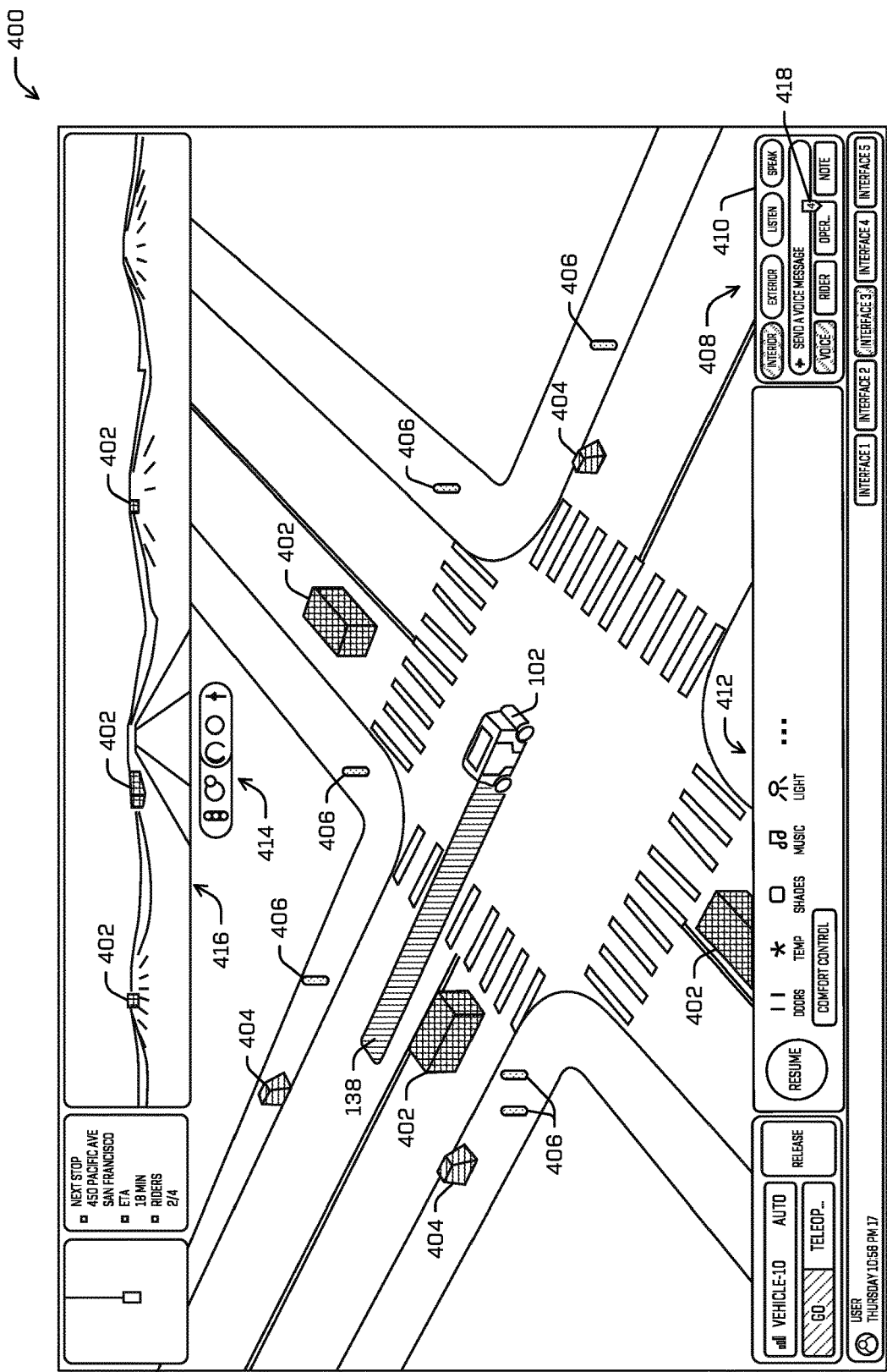
FIG. 4 illustrates an example user interface for remotely monitoring a vehicle as it traverses an environment.

FIG. 4 illustrates an example user interface (UI) 400 for remotely monitoring a vehicle 102 as it traverses an environment. In some examples, the user interface 400 may be presented on a display, such as the one or more displays 156 of the teleoperations system 148. As shown, the user interface 400 may include a digital representation of the vehicle 102 as it traverses the environment, as well as, in some instances, a driving corridor 138 that is associated with a trajectory of the vehicle 102.

In some examples, the user interface 400 may include digital representations of objects that are disposed within the environment. Each of the objects may represent different types of agents, such as vehicle agents 402, bicyclist agents 404, and pedestrian agents 406. For instance, if a detected type of object is another vehicle that is within the environment, the user interface 400 may represent the object as a vehicle agent 402. Similarly, if the detected type of object is a bicyclist or a pedestrian, the user interface 400 may represent the object as a bicyclist agent 404 or pedestrian agent 406, respectively. In some examples, different objects may comprise different shapes, sizes, colors, etc. depending on the type of agent. For instance, vehicle agents 402 may be represented by a first color (e.g., blue), bicyclist agents 404 may be represented by a second color (e.g., purple), and pedestrian agents may be represented by a third color (e.g., pink). As another example, a sedan may be represented by a first vehicle agent 402 that is a first size and/or shape associated with the sedan body style, a sport utility vehicle (SUV) may be represented by a second vehicle agent 402 that is a second size and/or shape associated with the SUV body style, a pickup truck may be represented by a third vehicle agent 402 that is a third size and/or shape associated with the pickup tuck body style, and a semi-trailer truck may be represented by a fourth vehicle agent 402 that is a fourth size and/or shape associated with the semi-trailer truck body style. Further, although illustrated in FIG. 4 as three-dimensional (3D) rectangular blocks, 3D trapezoidal blocks, and 3D cylinders for simplicity, it is to be understood that other shapes and/or designs are contemplated for representing the vehicle agents 402, bicyclist agents 404, and pedestrian agents 406. For instance, if a detected object comprises a sedan-type vehicle, then the vehicle agent 402 representing the object may be in the shape of a sedan-type vehicle.

In some examples, the user interface 400 may include multiple interface regions that are presented on different portions of a display. For instance, the interface regions may include one or more of a communication interface 408, a vehicle control interface 412, a vehicle status interface 414, and a 360-degree interface 416. In some instances, the user interface 400 may include more interface regions than shown in FIG. 4, and in other instances the user interface 400 may include less interface regions than shown.

The communication interface 408 of the user interface 400 may be configured to provide a remote teleoperator communications with one or more people. For instance, the communication interface 408 may include one or more chat interfaces 410 that the teleoperator may use to communicate with one or more occupants of the vehicle 102 (e.g., passengers and/or operators of the vehicle 102), pedestrians who are proximate the vehicle 102 (e.g., pedestrian agents 406 and/or bicyclist agents 404), other vehicles (e.g., vehicle agents 402), other teleoperators, third parties (e.g., first responders), and the like. Additionally, in some examples, the communication interface 408 may include one or more input elements, such as the "interior," "exterior," "listen," "speak," "voice," "rider," "ops," and "note" input elements. The communication interface 408 may even further include a text field and/or voice message field that enables the teleoperator to input text messages and/or record voice messages.

In some examples, each of the voice, rider, ops, and note input elements may be associate with different functionality and/or opening a different chat interface 410. For instance, the voice input element may be associated with sending voice and/or audio messages. With respect to FIG. 4, the voice input element is shown as selected. In some examples, when the voice input element is selected, the chat interface 410 may comprise an appearance similar to that shown in FIG. 4. In other words, if the voice input element is selected, then the interior, exterior, listen, and speak input elements may be displayed within the chat interface 410 of the communication interface 408. In some examples, the interior input element may cause voice and/or audio messages to be output within the interior of the vehicle 102, such that occupants inside of the vehicle 102 may hear the voice and/or audio messages. In contrast, the exterior input element may cause the voice and/or audio messages to be output outside of the vehicle 102 such that pedestrians who are proximate the vehicle may hear the voice and/or audio messages. In some examples, the listen input element allows the teleoperator to listen in the interior our outside the exterior of the vehicle. For instance, the listen input element may enable one or more microphones of the vehicle 102 to be used by the teleoperator. In some examples, the speak input element allows the teleoperator to speak with occupants of the vehicle or pedestrians proximate the vehicle without having to record a voice message (e.g., two-way communication).

In some examples, the rider input element may be associated with sending text messages to occupants of the vehicle. Similar to the voice input element, the rider input element may be associated with a respective chat interface 410 appearance that includes one or more additional input elements not shown in FIG. 4. In some examples, the ops input element may be associated with communicating with other teleoperators and/or operators of the vehicle 102, while the note input element may be associated with taking notes. Each of these input elements, in examples, may be associated with respective chat interface 410 appearances that include additional input elements not shown in FIG. 4. Further detail regarding the communication interface 408, including the various chat interfaces 410 and input elements, will be discussed in further detail below. In some examples, the communication interface 408 may present a new message indicator 418. The new message indicator 418 may be used to notify a teleoperator that new messages have been received within a chat interface that is not currently opened. For instance, in the new message indicator 418 in FIG. 4 may indicate that four new, unread messages have been received within the ops channel chat interface.

As noted above, the user interface 400 may additionally include a vehicle control interface 412. The vehicle control interface 412 may be configured to enable a teleoperator to control one or more components and/or features of the vehicle 102 (e.g., doors, windows, lights, shades, seats, stereo (e.g., music), display screens (e.g., play movies and/or videos, display user interfaces, etc.), climate control, etc.). As shown, in some examples the vehicle control interface 412 may include one or more input elements for controlling or adjusting the one or more components of the vehicle 102. For instance, the "doors" input element may allow the teleoperator to open and/or close the doors of the vehicle 102. The "temp" input element may allow the teleoperator to adjust the temperature of the vehicle 102 (e.g., turn on the air-conditioning or the heater). In some examples, the "shades" input element may allow the teleoperator to lower and/or raise the sun-shades of the vehicle, and the "music" input element may allow the teleoperator to remotely control music that is output by the vehicle 102. Additionally, the "light" input element may allow the teleoperator to control the lights of the vehicle 102, such as interior and/or exterior lights. The vehicle control interface 412 may include any number of input elements, including more input elements than that shown in FIG. 4, or less input elements that shown.

In some instances, each respective input element of the vehicle control interface 412 may be associated with one or more additional input elements for controlling the component of the vehicle. For instance, when a specific input element of the vehicle control interface 412 is selected, additional input elements for controlling the component may be displayed. As an example, if the teleoperator selects the doors input element, then additional input elements may be displayed, such as an input element to close the doors, as well as an input element to open the doors. This, and additional functionality of the vehicle control interface 412 will be discussed in further detail below.

The user interface 400 may additionally include a vehicle status interface 414 in various examples. The vehicle status interface 414 may be configured to provide the user with information associated with the vehicle 102. In some examples, the information may include one or more of a current speed of the vehicle 102, a direction of travel of the vehicle 102 (e.g., a trajectory), traffic signage associated with a current route of the vehicle 102 (e.g., whether the vehicle is at a stop sign, a speed limit sign associated with the current route, etc.), and the like. Additional detail associated with the vehicle status interface 414 will be discussed later in this disclosure.

In some examples, the user interface 400 may include a 360-degree interface 416. In at least one example, the 360-degree interface 416 may include a 360-degree camera feed of one or more cameras of the vehicle 102. Additionally, or alternatively, the 360-degree interface 416 may include digital representations of the environment, including one or more objects within the environment, from a perspective of an exterior of the vehicle 102. For instance, the vehicle 102 may include one or more sensors that are located at various locations of the vehicle 102 (e.g., an a first side, second side, third side, and forth side of the vehicle 102), and a viewing perspective of the 360-degree interface 416 may correspond with the locations of the one or more sensors.

Figure 5A:
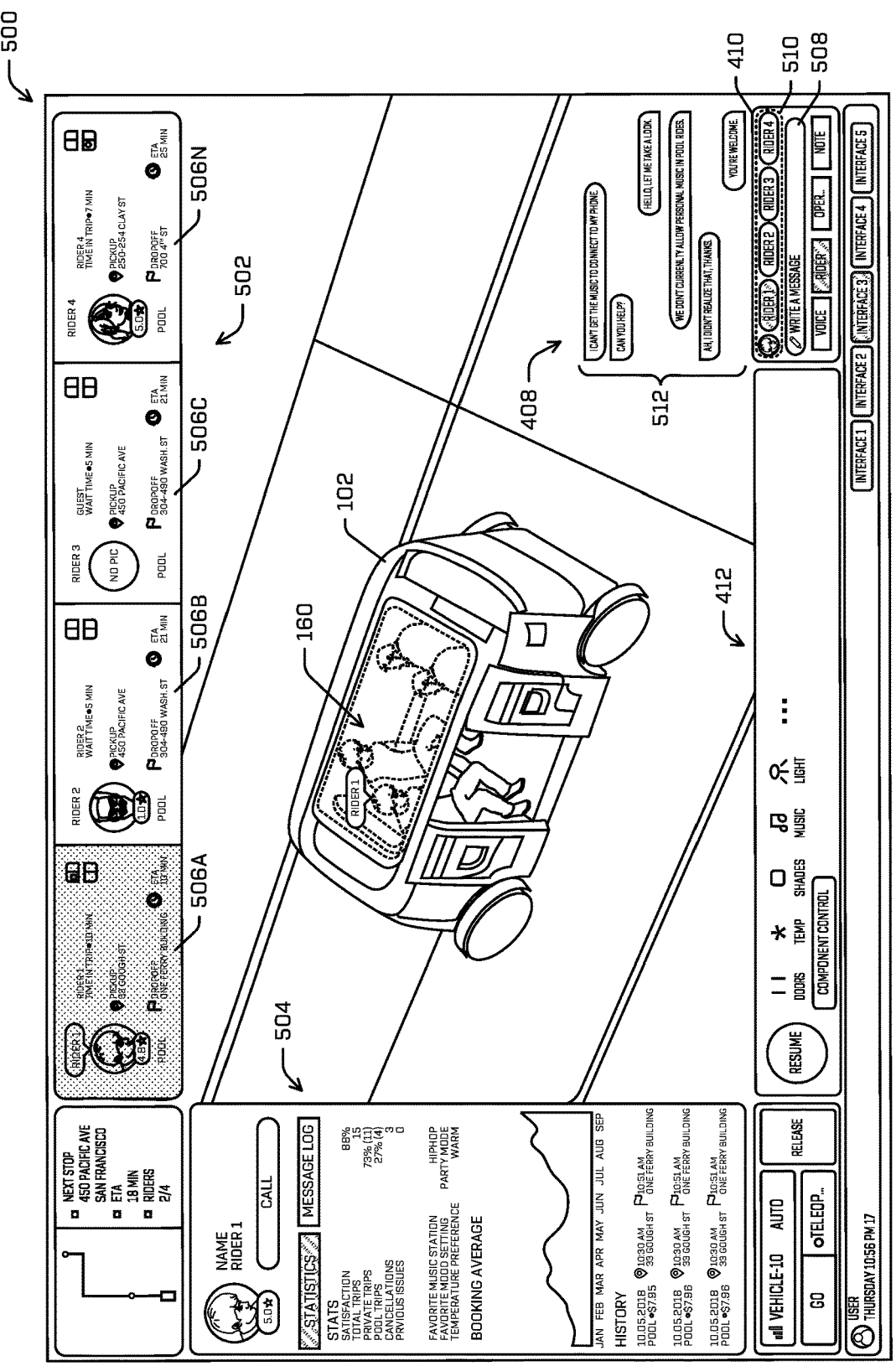
FIGS. 5A and 5B illustrate example user interfaces for remotely monitoring a vehicle. The example user interfaces include example detail of information associated with occupants of the vehicle.
Figure 5B:
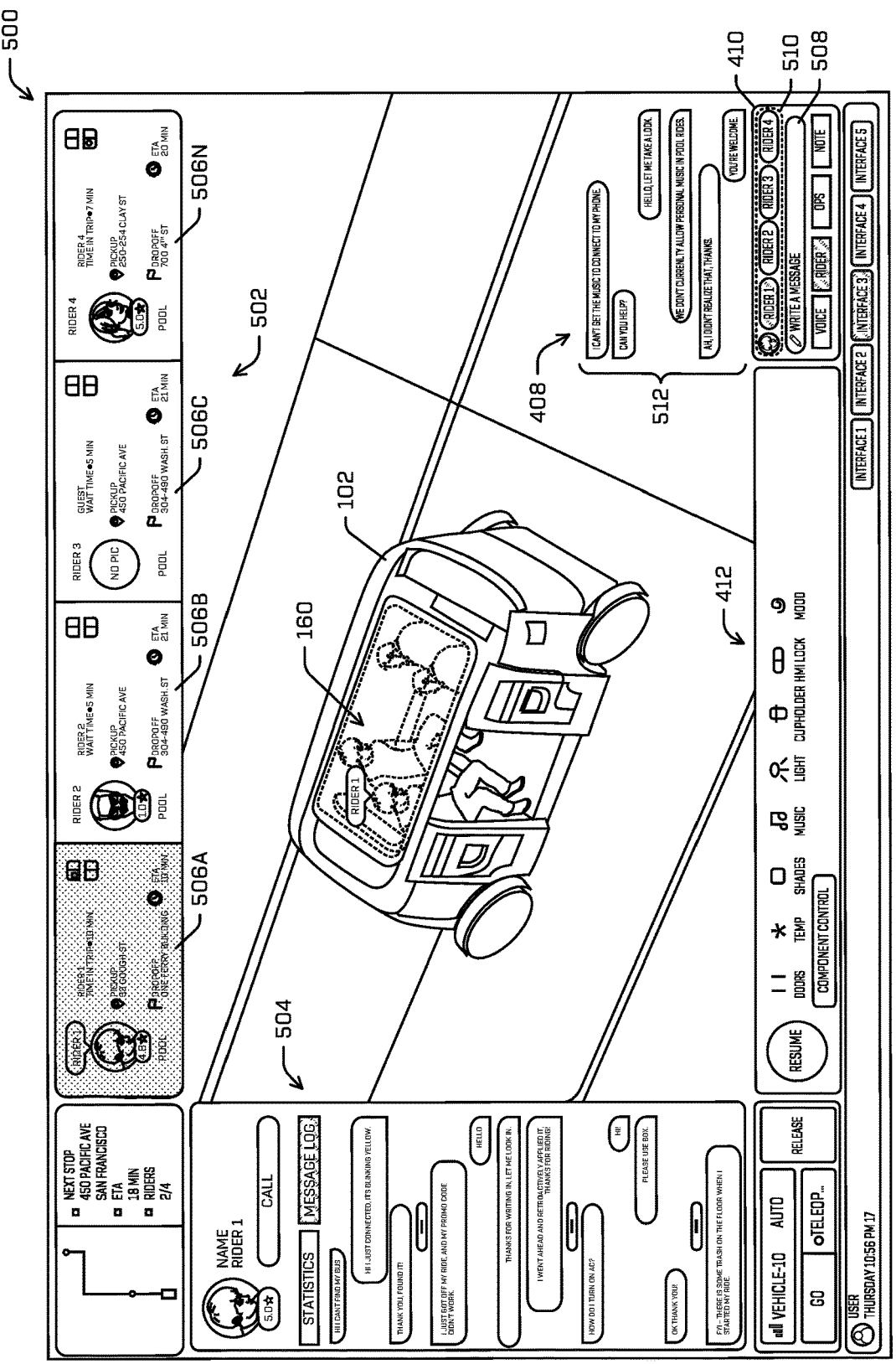

FIGS. 5A and 5B collectively illustrate an example user interface 500 for remotely monitoring a vehicle 102. The example user interface 500 includes one or more example interface regions, including a first interface region 502 and a second interface region 504. The example first interface region 502 and second interface region 504 may include information associated with the one or more persons. The one or more persons, in some examples, may include occupants 160 of the vehicle 102, pedestrians who are proximate the vehicle 102, etc.

As shown, the communication interface 408 of the example user interface 500 includes an example chat interface 410 that is associated with the rider input element being selected. In some examples, when the rider input element is selected, the chat interface 410 may include the one or more input elements shown in FIGS. 5A and 5B, such as the text field 508 for inputting messages, and the rider selection inputs 510. In various examples, each respective rider selection input 510 may be associated with a respective person (e.g., an occupant of the vehicle, a pedestrian, etc.). For instance, by selecting the "rider 1" input element as shown, the teleoperator may be able to communicate with a first person associated with the vehicle (e.g., via a mobile device associated with the first person). Additionally, in some examples, the chat interface 410 may be extended to include a dialogue 512 between the teleoperator and the person. For instance, when messages are sent to the person and/or received from the person, the dialogue 512 may be updated to include the messages. In some examples, a respective rider selection input 510 may be associated with a current occupant 160 of the vehicle or may instead be associated with a previous occupant of the vehicle 102 (e.g., a person who was dropped-off) and/or a future occupant of the vehicle 102 (e.g., a person who is about to be picked-up).

In some examples, the first interface 502 may display first information associated with the one or more persons. The first interface 502 may, in some instances, include a first profile 506A, a second profile 506B, a third profile 506C, and/or a fourth profile 506N (hereinafter referred to collectively as "profiles 506," where N represents any number greater than 1). Each respective profile of the profiles 506 may include first information associated with a person. In some examples, the first information may include a picture of the person, an identity of the person, a rating of the person, social media information associated with the person, a pickup location associated with the person, a drop-off location associated with the person, an estimated time of arrival (ETA) associated with at least one of picking up the person or dropping off the person, and the like.

In some instances, the profiles 506 may be individual selectable by the teleoperator. When selected, additional information that is associated with a person corresponding with the profile may be displayed within the second interface region 504. For instance, profile 506A that is associated with "rider 1" is selected in FIGS. 5A and 5B, and additional information associated with rider 1 is displayed within the second interface region 504.

The example second interface 504 of the example user interface 500 may include additional input elements, such as a "call" input to facilitate a voice call with the person, a "statistics" input to display statistics associated with the person, and a "message log" input to show a history of communications with the person. As shown in FIG. 5A, the statistics input of the example second interface 504 is selected, and example statistics associated with rider 1 are shown. Some of the example statistics include a satisfaction percentage, a total trip count, a private trip percentage, a pool (e.g., public) trip percentage, a cancellation count, and a previous issues count. Additional example statistics shown may include a favorite music station and/or genre, a favorite mood setting, a temperature preference, a booking average chart, and a ride history, including previous pickup and drop-off locations. Although these example statistics are shown in FIG. 5A, it is contemplated that other statistics may be displayed.

In FIG. 5B, the message log input of the example second interface 504 of the user interface 500 is selected. In some examples, when the message log input is selected, the example second interface 504 may display a dialogue history associated with the person. In FIG. 5B, a dialogue history between teleoperators and rider 1 is shown since profile 506A that is associated with rider 1 is selected.

Figure 6A:
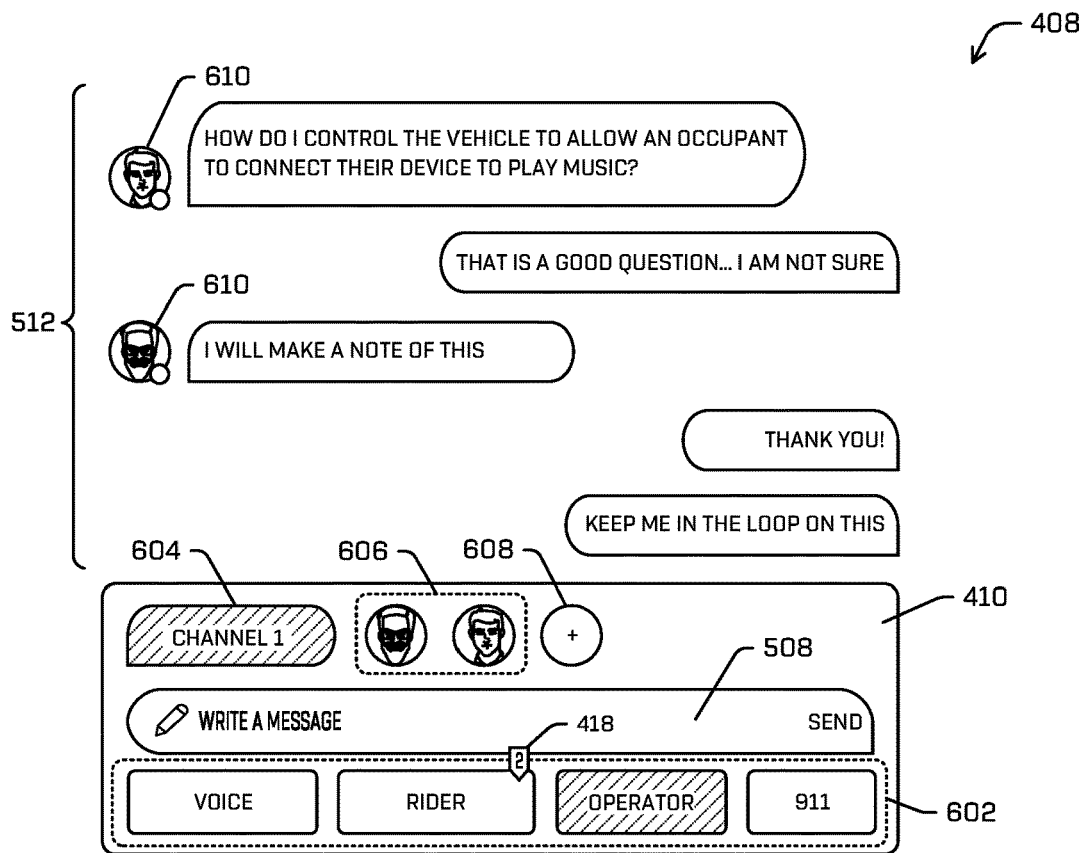
FIGS. 6A-6J illustrate example communication interface chat interfaces of a user interface.

FIGS. 6A-6J illustrate various example layouts of example communication interfaces 408 of a user interface. With reference to FIG. 6A, the example communication interface 408 includes a chat interface 410. In some examples, the chat interface 410 may include one or more input and/or output elements, such as a text input field 508, a new message indicator 418, and one or more chat interface selection inputs 602. The new message indicator 418 may indicate that one or more new messages have been received in a different chat interface. For instance, in FIG. 6A the new message indicator 418 is indicating that two new messages have been received in the "RIDER" chat interface.

As shown in FIG. 6A, the "OPERATOR" chat interface selection input 602 is selected. In some examples, based at least in part on the OPERATOR chat interface selection input 602 being selected, the chat interface 410 may present one or more additional input and/or output elements, such as a channel selection 604, channel member identifiers 606, and a member addition input 608. The channel selection 604 may indicate a channel that the teleoperator is communicating with, such as a group chat between multiple teleoperators, and the channel member identifiers 606 may indicate respective persons who are also communicating using the channel. Additionally, the member addition input 608 may be used by a teleoperator to request another person to join the channel, such as another teleoperator. In some examples, based at least in part on the OPERATOR chat interface selection input 602 being selected, and based at least in part on "CHANNEL 1" being selected, a dialogue 512 of messages sent between the teleoperator and the various channel members may be presented. Additionally, individual messages of the dialogue 512 may include an identifier 610 to indicate which member of the channel sent the message.

Figure 6B:
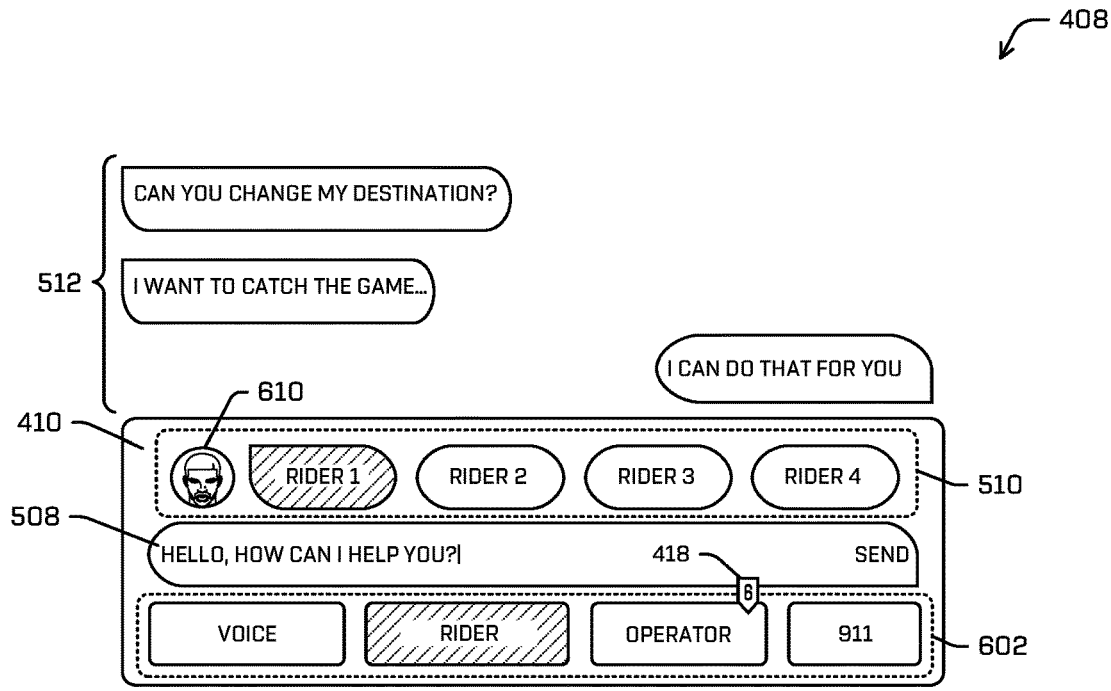

With reference to FIG. 6B, the example communication interface 408 includes a chat interface 410. In some examples, the chat interface 410 may include one or more input and/or output elements, such as a text input field 508, a new message indicator 418, and one or more chat interface selection inputs 602. The new message indicator 418 may indicate that one or more new messages have been received in a different chat interface. For instance, in FIG. 6B the new message indicator 418 is indicating that six new messages have been received in the "OPERATOR" chat interface.

As shown in FIG. 6B, the "RIDER" chat interface selection input 602 is selected. In some examples, based at least in part on the RIDER chat interface selection input 602 being selected, the chat interface 410 may present one or more additional input and/or output elements, such as one or more rider selection inputs 510 and a rider selection indicator 610. The rider selection indicator 610 may comprise an identifier associated with a selected rider, such as a picture, symbol, and the like. Additionally, in some examples the selected rider selection input 510 may comprise a different color than other, unselected rider selection inputs 510, as shown. In some examples, based at least in part on the RIDER chat interface selection input 602 being selected, and based at least in part on "RIDER 1" being selected, a dialogue 512 of messages sent between RIDER 1 and the teleoperator may be presented.

Figure 6C:
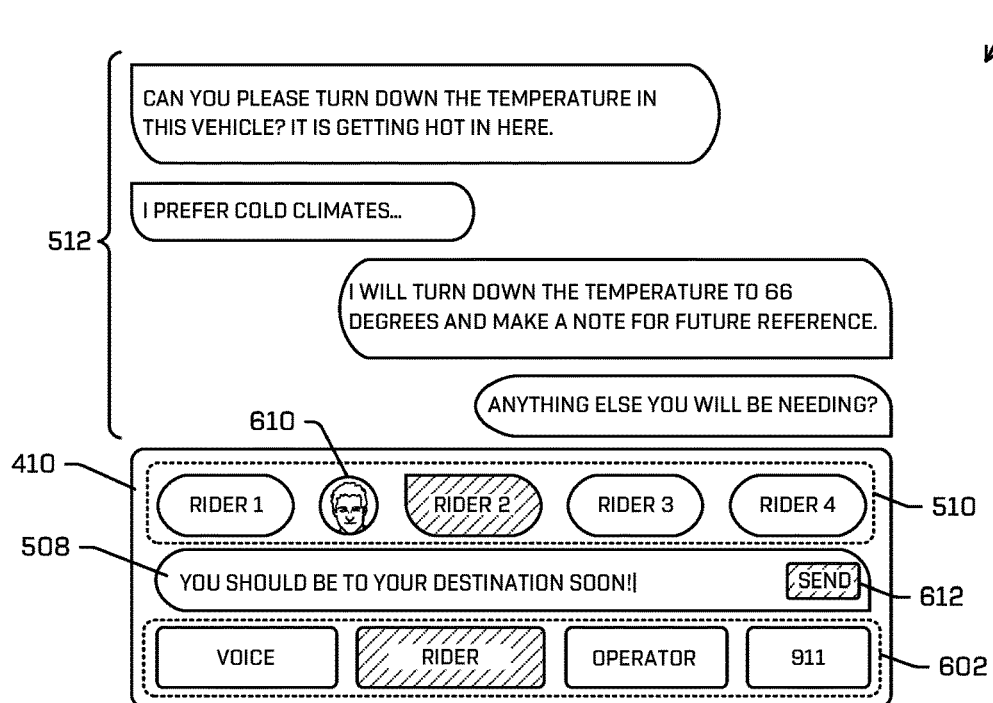
Figure 6D:
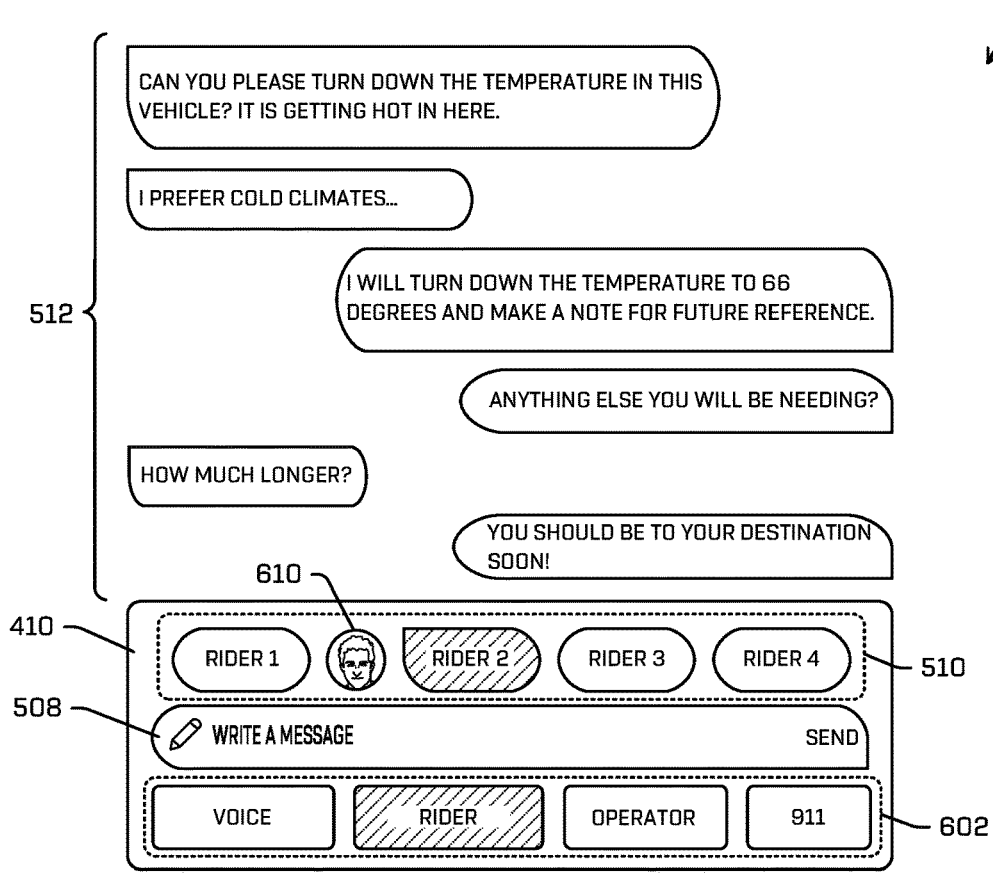

Moving to FIG. 6C, the RIDER chat interface selection input 602 is still selected, however, "RIDER 2" has been selected from the rider selection inputs 510 and the rider selection indicator 610 has been updated to indicate that RIDER 2 is selected. In some examples, based at least in part on the RIDER chat interface selection input 602 being selected, and based at least in part on RIDER 2 being selected, a dialogue 512 of messages sent between RIDER 2 and the teleoperator may be presented. As shown in FIG. 6C, a message has been input into the text field 508 by a teleoperator, and the send message input 612 has been selected. Accordingly, in FIG. 6D, the dialogue 512 is updated to include the message that was sent by the teleoperator, as well as to include additional messages received from RIDER 2 before the message was sent by the teleoperator.

Figure 6E:
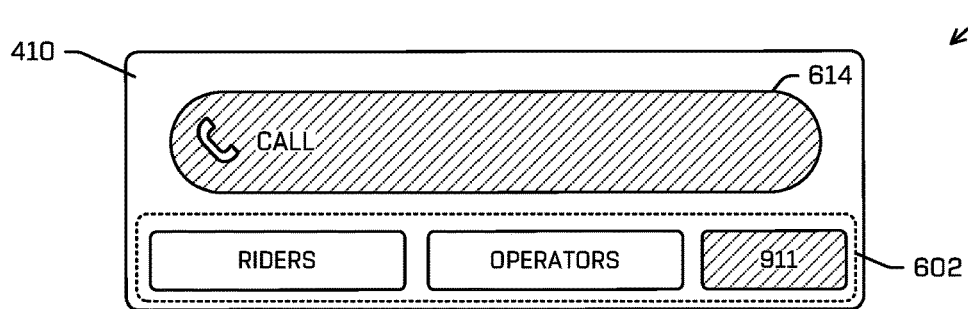
Figure 6F:
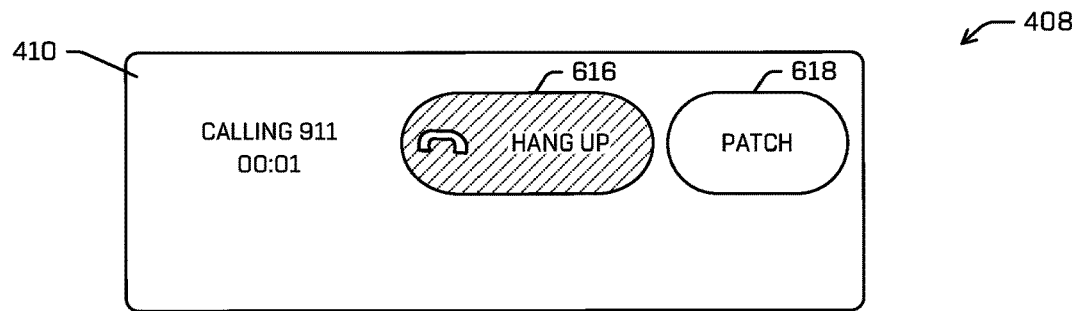

FIG. 6E illustrates yet another example layout of a communication interface 408 of a user interface. The example layout of the communication interface 408 includes a chat interface 410 and one or more chat interface selection inputs 602. In the example shown in FIG. 6E, the "911" chat interface selection input 602 is selected, and the chat interface 410 is changed to include a call input 614. In some examples, the call input 614 is configured to, when selected, facilitate a 911 emergency call between the teleoperator and a 911 operator. After the call input 614 is selected in FIG. 6E, the chat interface 410 may be updated to show additional elements, such as a "HANG UP" input 616 to end the 911 call, a "PATCH" input 618, and/or a duration of the 911 call as shown in FIG. 6F.

Figure 6G:
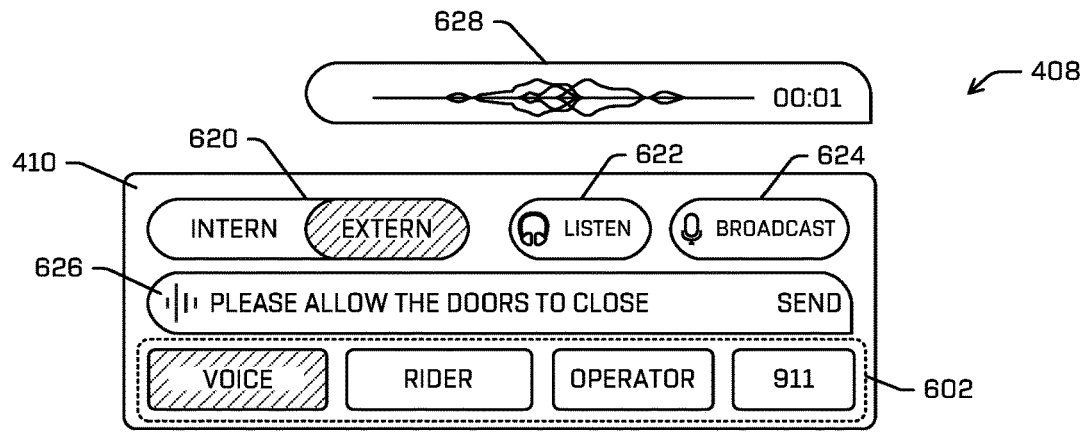
Figure 6H:
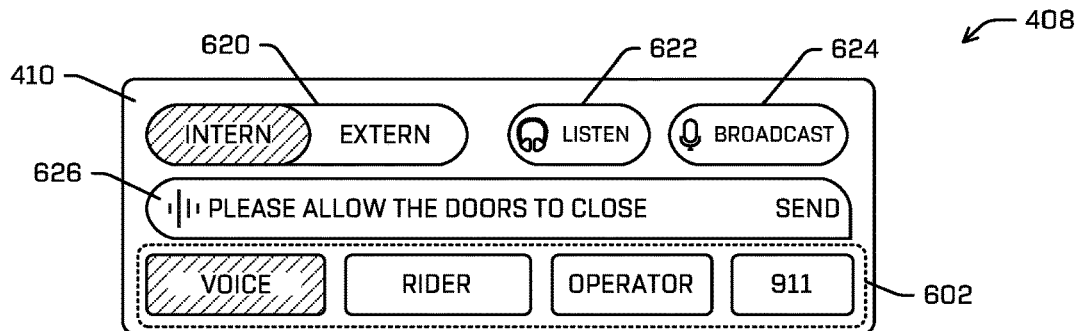

FIG. 6G illustrates another example layout of a communication interface 408 of a user interface. The example layout of the communication interface 408 includes a chat interface 410. In the example shown in FIG. 6G, the "VOICE" chat interface selection input 602 is selected, and the chat interface 410 is changed to include one or more additional input and/or output elements associated with the VOICE chat interface. For instance, the one or more additional elements may include an internal and external selection 620, a listen input 622, a broadcast input 624, and a message input field 626.

In some examples, the internal and external selection 620 may be configured to allow the teleoperator to output audio messages internally within the vehicle or externally of the vehicle. In FIG. 6G, the internal and external selection 620 is selected to output the audio message externally of the vehicle, while in FIG. 6H the internal and external selection 620 is selected to output the audio message internally within the vehicle. The listen input 622 may, in some instance, be configured to allow the teleoperator to listen to audio messages. For instance, a person who is associated with the vehicle (e.g., occupant, pedestrian, etc.) may send a voice message to the teleoperator and the teleoperator may listen to the voice message using the listen input 622. In some examples the broadcast input 624 may be used by the teleoperator to enable 2-way communication with persons associated with the vehicle, for instance, without having to pre-record voice messages or type a message that is to be converted to computerized speech capable of being audibly output.

As noted above, the one or more additional elements may also include the message input field 626. In at least one examples, the message input field 626 may be used by the teleoperator to record voice messages that are to be sent. Additionally, or alternatively, the message input field 626 may be used by the teleoperator to type or otherwise input plain-text messages that are to be converted to computerized speech capable of being audibly output by the vehicle. In some examples, when a voice message is sent by the teleoperator, an audio signature 628 that is representative of the voice message may be displayed by the communication interface. In this way, the audio signature 628 allows the teleoperator to playback the voice message at a later time if desired.

Figure 6I:
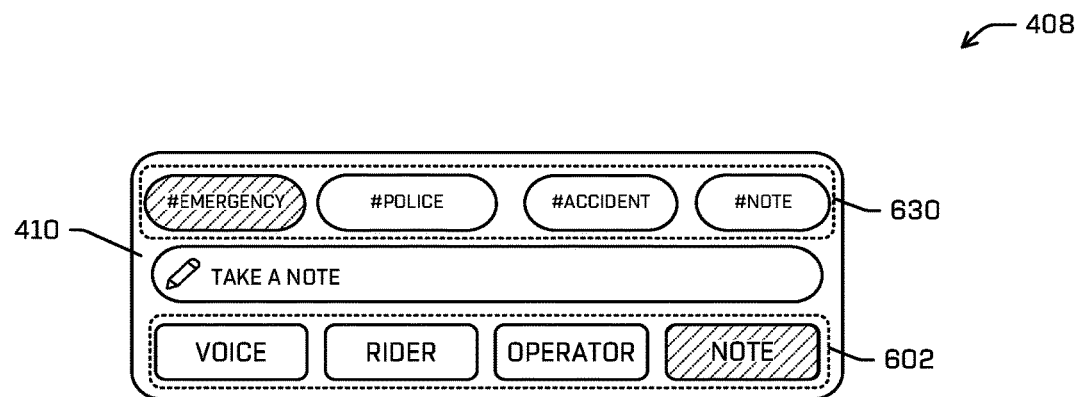
Figure 6J:
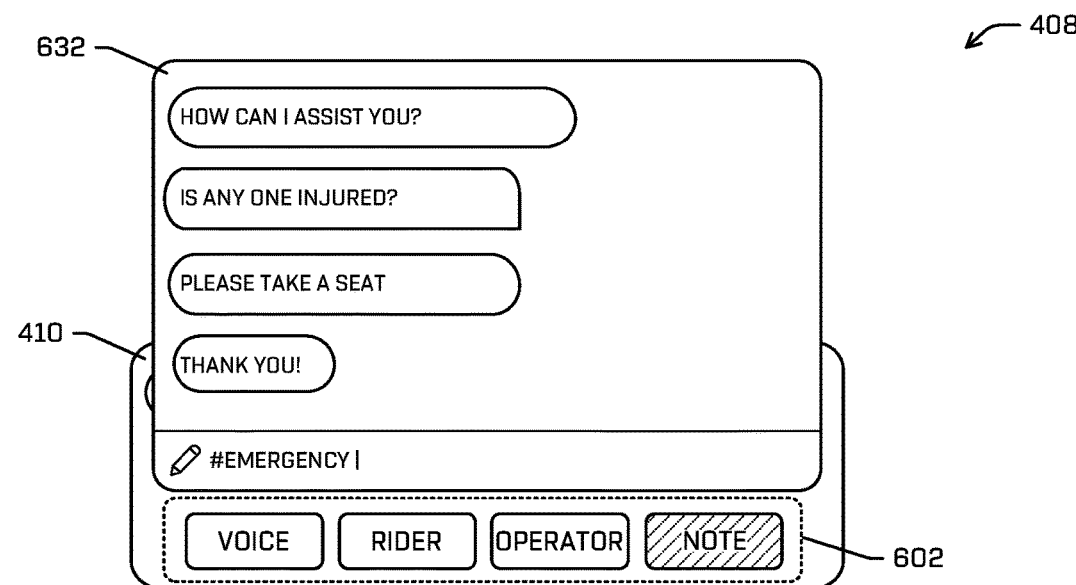

FIG. 6I illustrates another example layout of a communication interface 408 of a user interface. The example layout of the communication interface 408 includes a chat interface 410. In the example shown in FIG. 6I, the "NOTE" chat interface selection input 602 is selected, and the chat interface 410 is changed to include one or more additional input and/or output elements associated with the NOTE chat interface, such as quick note inputs 630. In some examples, one of the quick note inputs 630 may be selected to generate one or more message suggestions that are associated with the quick note input. For instance, in FIG. 6I the "#EMERGENCY" quick note input 630 is selected, and in FIG. 6J a message suggestion window 630 is presented that includes one or more suggested messages that are associated with the #EMERGENCY quick note input. When using the NOTE chat interface, notes may be logged for future reference. For instance, if a vehicle experiences a fault condition, a fault code associated with the fault condition may be saved using the NOTE chat interface.

Figure 7:
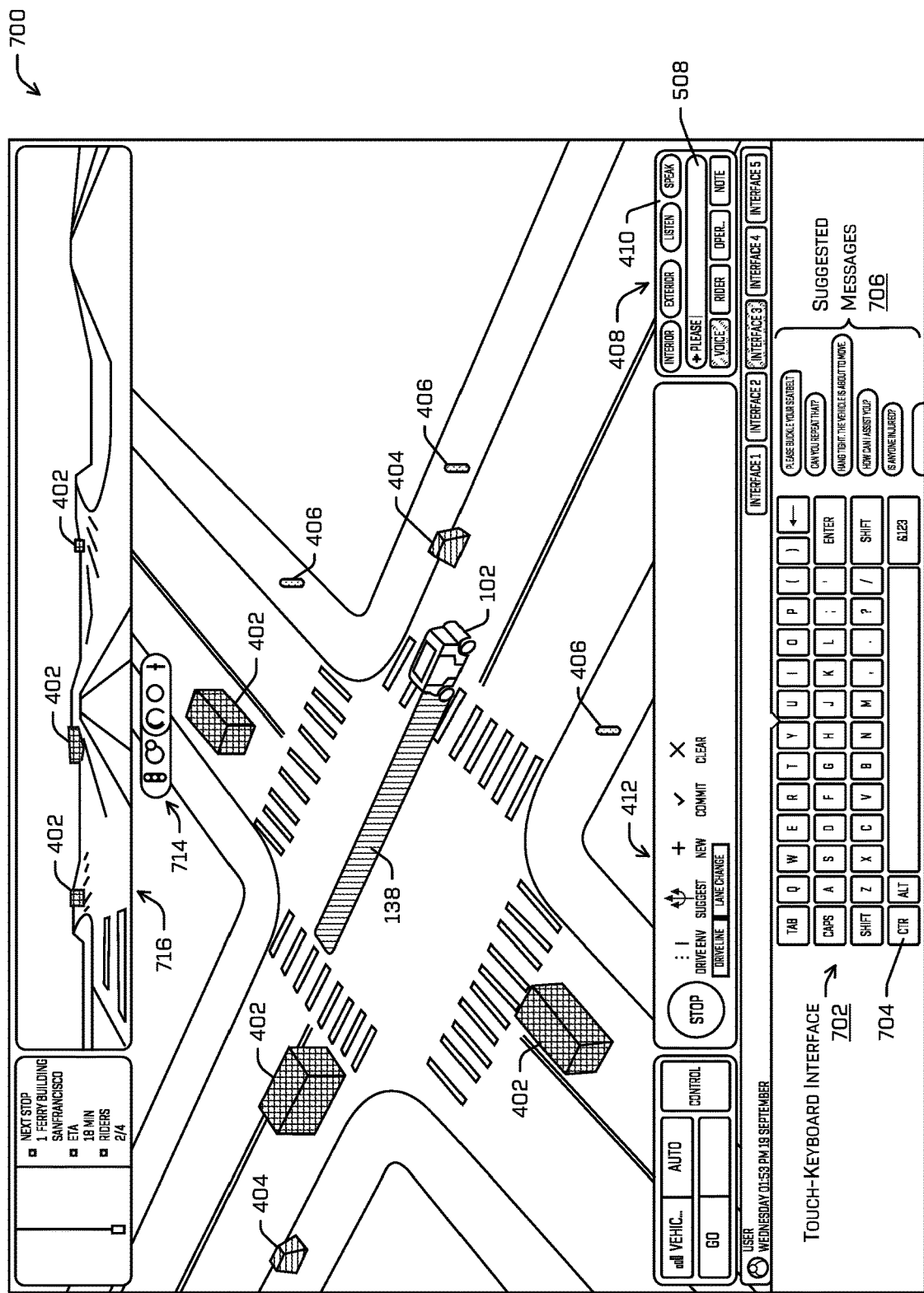
FIG. 7 illustrates yet another user interface that includes a touch-keyboard interface.

FIG. 7 illustrates yet another example user interface 700 that includes a touch-keyboard interface 702. The touch-keyboard interface 702 may comprise one or more key inputs 704 that may be used by the teleoperator to, among other things, generate messages using the communication interface 408. In some examples, the touch-keyboard interface 702 may be presented on the same display as the user interface 700 or may be presented on a different display.

In some examples, when a teleoperator is typing a message, note, etc., one or more suggested messages 706 may be presented on the display based at least in part on what is being typed by the teleoperator (e.g., predictive text). For instance, a word and/or phrase that is being typed by a teleoperator may be analyzed to determine a context associated with the word or phrase in order to identify suggested messages. As an example, if the teleoperator has typed the word "please" into the text field 508 of the communication interface 408, then the one or more suggested messages 706 may include at least a first suggested message that reads "please buckle your seatbelt." Additionally, or alternatively, the one or more suggested messages 706 may include at least a first suggested message that does not contain the word please, but that nonetheless is deemed to be associated with requesting something from a person based at least in part on the context generally used with the word "please." By way of example, a suggested message that may be deemed to be associated with the word please may read "can you repeat that?"

Figure 8A:
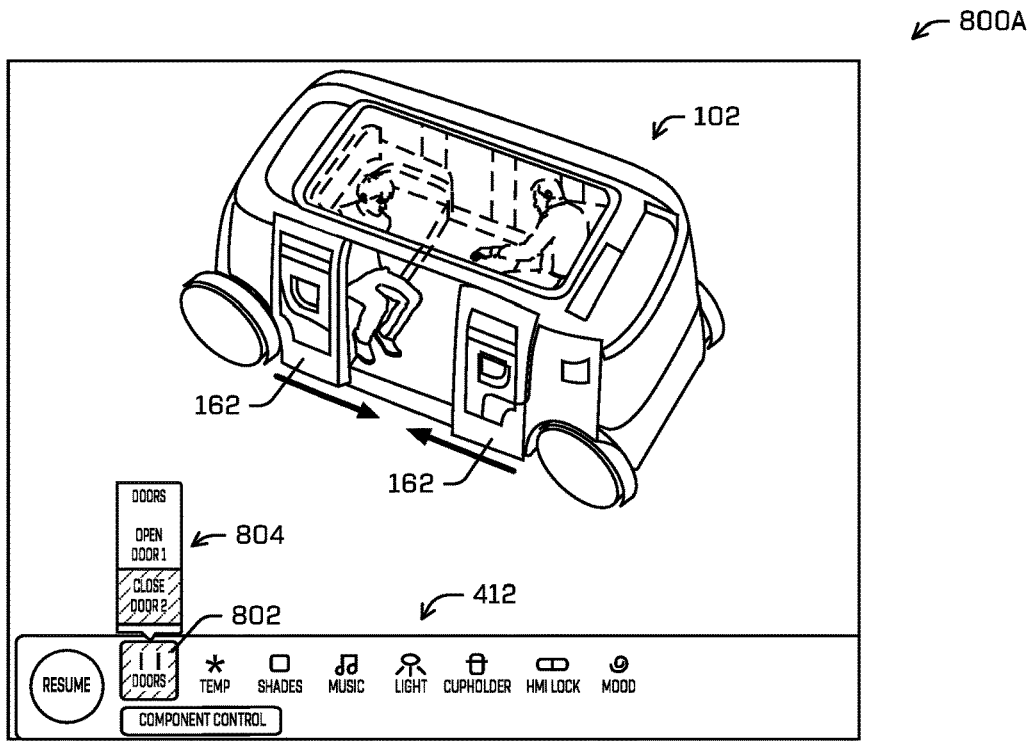
FIGS. 8A and 8B illustrate an example user interface that includes an example vehicle and an example vehicle control interface. The vehicle control interface may control one or more components of the vehicle.
Figure 8B:
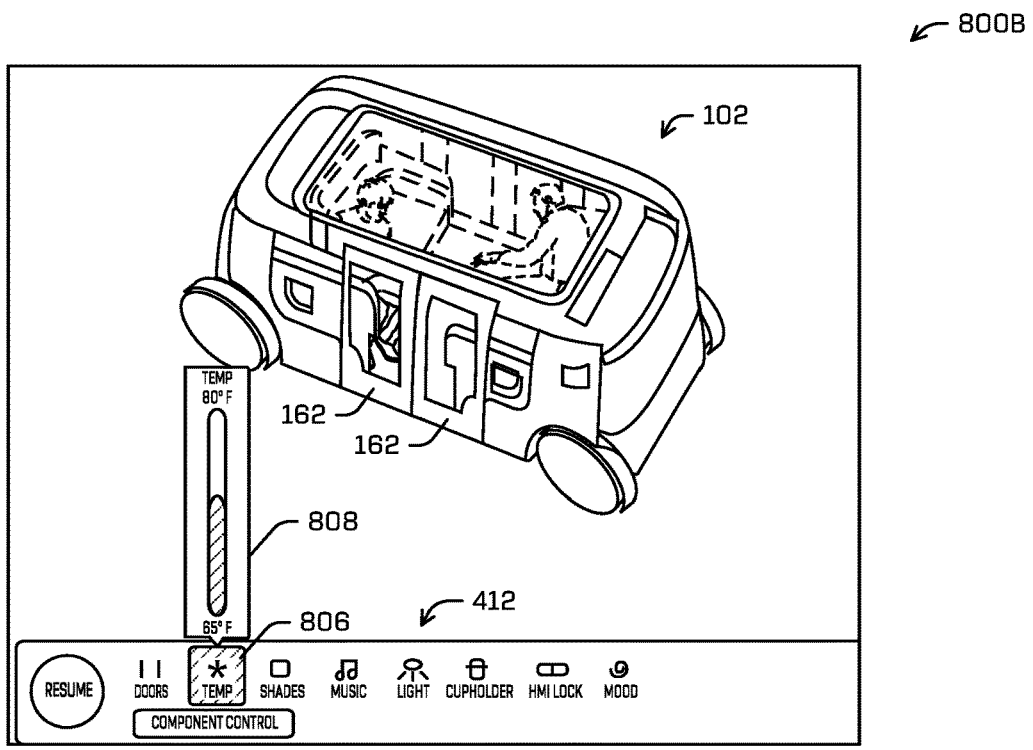

FIGS. 8A and 8B illustrate example user interfaces 800A and 800B that include an example vehicle 102 and an example vehicle control interface 412. The vehicle control interface 412 may include one or more inputs for controlling one or more components and/or features of the vehicle 102, such as the doors 162, a temperature of the vehicle 102, lights, music, and so forth.

In some examples, when an input of the vehicle control interface 412 is selected, one or more additional inputs for controlling the component and/or feature associated with the input may be displayed. For instance, with reference to FIG. 8A, the door control input 802 has been selected and additional door control inputs 804 have been displayed. The additional door control inputs 804 may include, in some examples, a first input for opening and closing a first door of the vehicle, and a second input for opening and closing a second door of the vehicle. In FIG. 8A, the input to close door 2 of the vehicle 102 has been selected and door 2 (doors 162) are closing as shown by the arrows. In some examples, once the doors 162 of the vehicle 102 are closed, the digital representation of the vehicle 102 may be updated to indicate that the doors are closed, as shown in FIG. 8B.

In FIG. 8B, the temperature control input 806 of the vehicle control interface 412 has been selected and an additional temperature control input 808 has been displayed. The additional temperature control input 808 may allow the teleoperator to remotely change the temperature of the vehicle by interacting with the additional temperature control input.

Figure 9A:
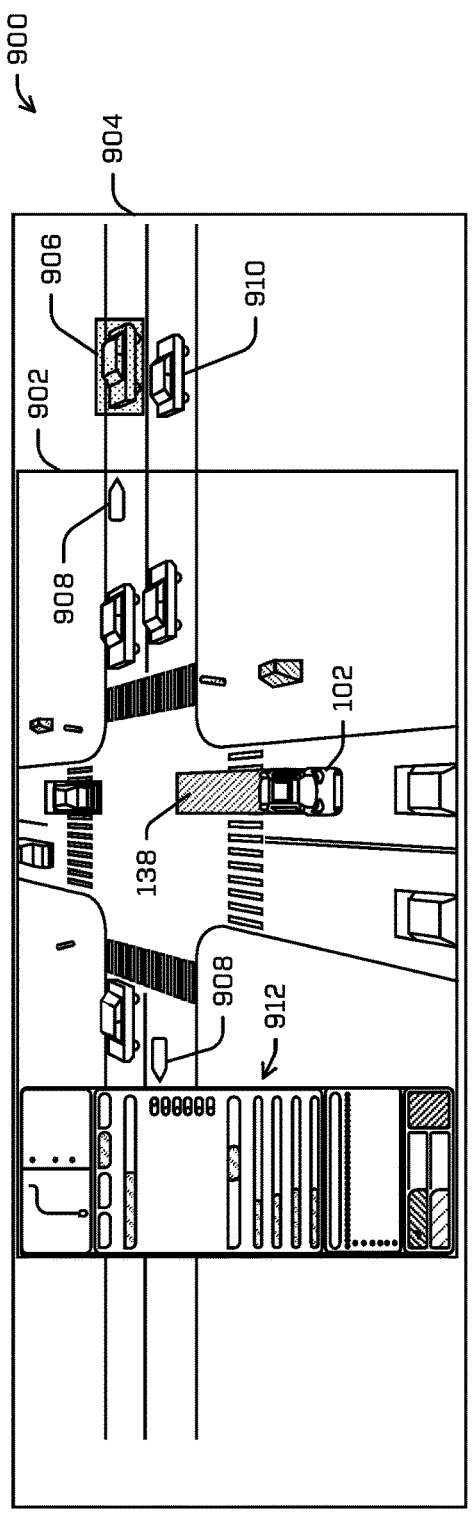
FIGS. 9A and 9B collectively illustrate another example user interface that includes example off-screen indicators to indicate that a vehicle, which is not shown on the example user interface, is approaching the example vehicle.
Figure 9B:
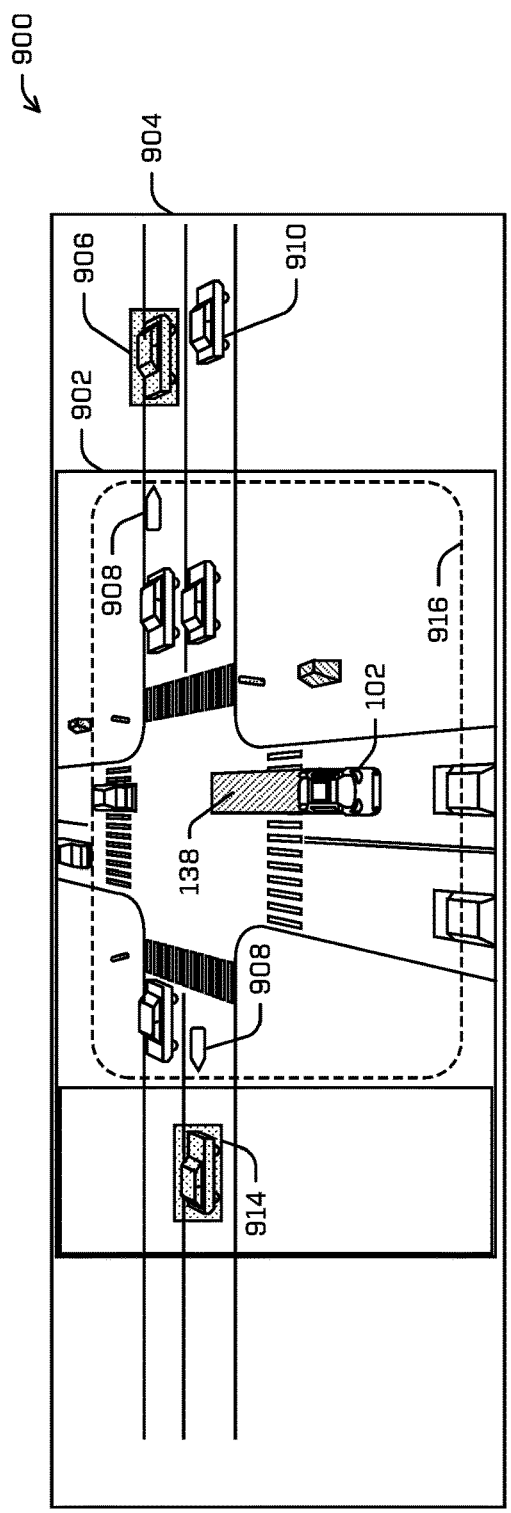

FIGS. 9A and 9B collectively illustrate another example user interface 900 that includes example off-screen indicators 908 to indicate that a vehicle, which is not shown on a display, is approaching the example vehicle 102. In some examples, the user interface 900 may include a first field of view 902 that is capable of being presented on a display. However, the vehicle 102 may be able to detect the presence of objects that are located outside the first field of view in a second field of view 904. In some examples, however, a display that is presenting the user interface 900, such as the one or more displays 156 described herein, may not be large enough to contain a complete graphical representation of the entire second field of view 904. As such, the vehicle 102 may be responding (e.g., stopping, yielding, or otherwise reacting) to an object, such as the detected vehicle 906, that is not viewable to a remote teleoperator via the teleoperator interface.

Additionally, or alternatively, although a detected object 914 may otherwise be located within the first field of view 902, the detected object 914 may be obstructed from view of the teleoperator by an interface region 912 that is presented on the user interface 900. Accordingly, off-screen indicators 908 may be used to present indications of detected objects 914 that the vehicle 102 may be responding to that are located outside of a canvas 916, but nonetheless still located within the first field of view 902.

In this way, by presenting notifications associated with off-screen objects, the amount of information that is displayed on the user interface can be limited so as not to overburden a user with information, while also making the user aware of the external information that may not be displayed on the user interface. This helps a remote user to make safer decisions in a safety-critical environment when the remote user is not physically present in the vehicle.

In some examples, detectable objects that the vehicle may be actively responding to (e.g., yielding, stopping, slowing, accelerating, etc.) will be represented with off-screen notifications 908. For instance, the vehicle 102 may detect that another vehicle 910 is located within the second field of view 904. However, an off-screen notification 908 may not be presented on the user interface 900 to indicate the presence of the other vehicle 910 because the direction of travel (e.g., trajectory) of the other vehicle 910 is moving away from the vehicle 102. In some examples, the off-screen notifications 908 may indicate the direction in which detected objects 906 and/or 914 are approaching the vehicle 102 from, a type of object associated with the detected objects 906 and/or 914 (e.g., whether the detected objects are a vehicle, pedestrian, bicyclist, etc.), an estimated amount of time until the detected objects 906 and/or 914 is within the first field of view 902 and/or the canvas 916, and the like. In some examples, whether off-screen notifications 908 are presented on the user interface 900 may be based at least in part on a speed determined for the detected objects 906 and/or 914, an amount of time until the detected objects 906 and/or 914 enter the first field of view 902, and/or a size of the detected objects 906 and/or 914.

Figure 10A:
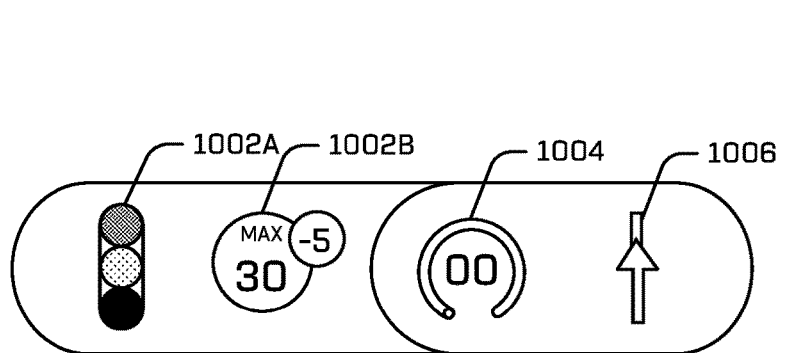
FIGS. 10A and 10B illustrate an example vehicle status interface usable with the example user interfaces described in this disclosure to display a status of a vehicle being remotely monitored.
Figure 10B:
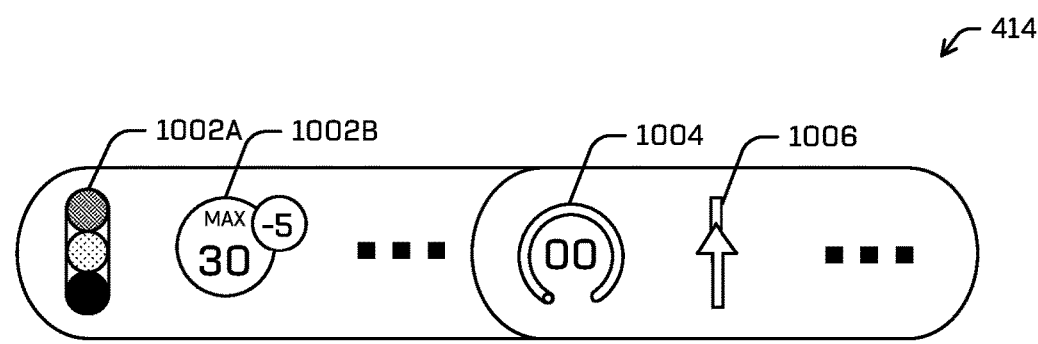

FIGS. 10A and 10B illustrate an example vehicle status interface 414 that may be included in one or more of the example user interfaces described in this disclosure. The example vehicle status interface 414 may include one or more output elements 1002-1008 that are configured to provide information associated with a vehicle. For instance, the vehicle status interface 414 may include one or more traffic signage elements 1002A and 1002B that are indicative of traffic lights and/or traffic signage that the vehicle is responding to, such as a traffic light, caution light, speed limit sign, exit sign, stop sign, yield sign, do not enter sign, railroad crossing sign, and the like.

In some examples, the vehicle status interface 414 may include a current speed indicator 1004 that indicates a current speed of the vehicle. In FIGS. 10A and 10B, the current speed indicator 1004 is indicating that the vehicle is stopped. In some examples, the vehicle status interface 414 may include a trajectory element 1006 that indicates a current and/or planned trajectory of the vehicle. In various examples, the vehicle status interface 414 may extend horizontally as shown in FIG. 10B to include additional output elements as necessary. Likewise, the vehicle status interface 414 may retract horizontally as shown in FIG. 10A based at least in part on the amount of output elements being displayed.

Example Methods

Figure 11:
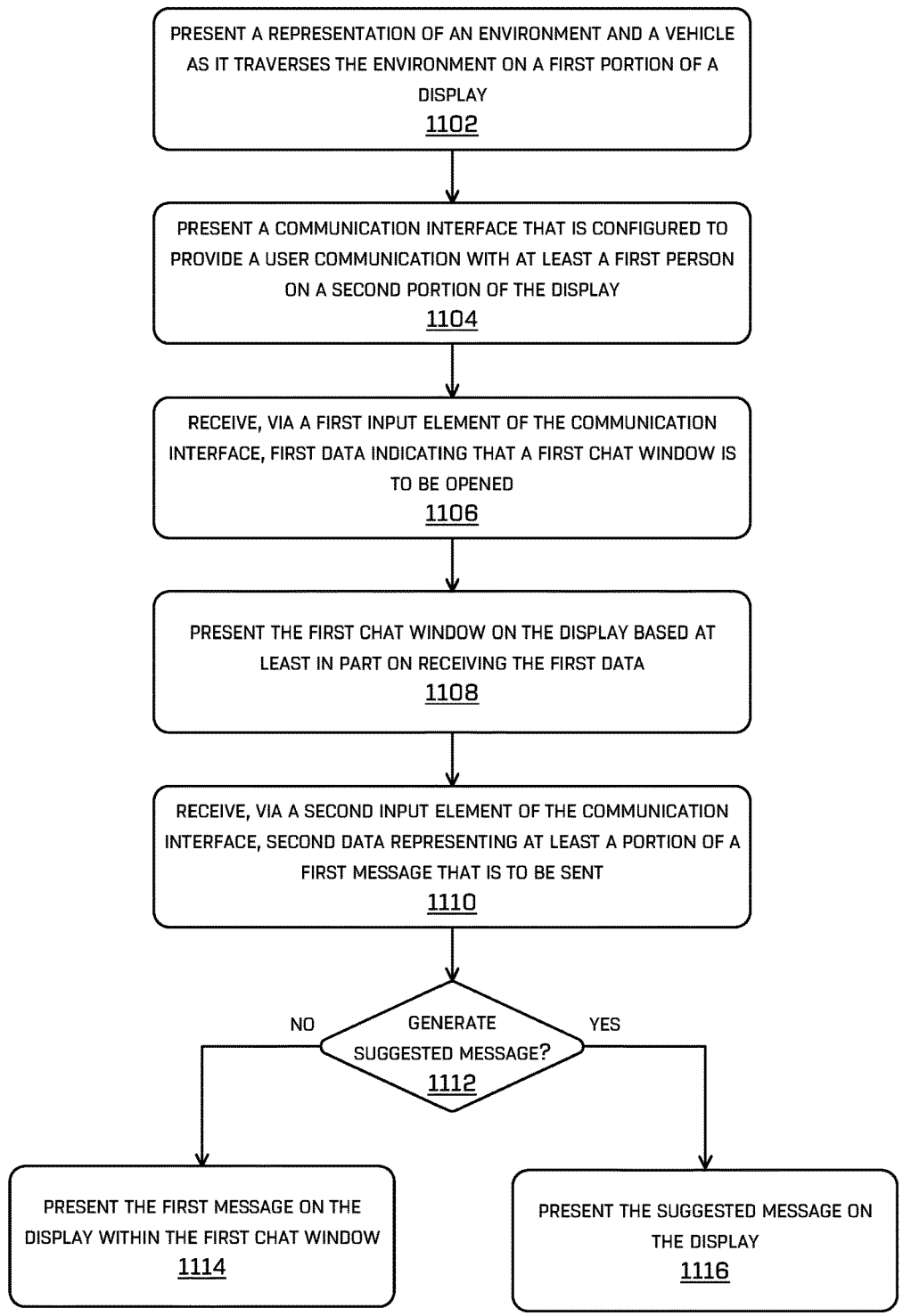
FIG. 11 is a flowchart illustrating an example method of presenting a user interface on a display for the remote monitoring and/or controlling of a vehicle.
Figure 12:
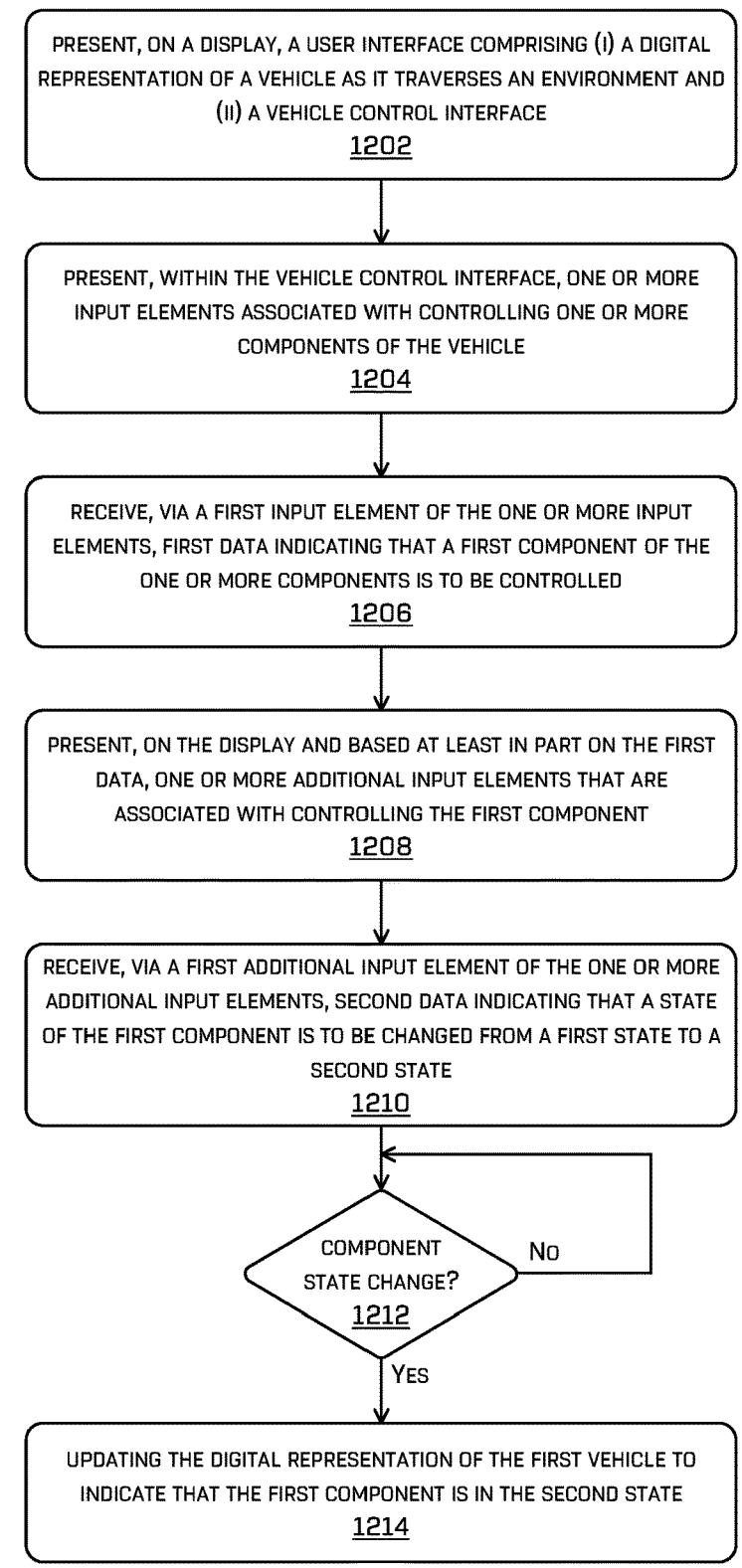
FIG. 12 is a flowchart illustrating another example method of presenting a user interface on a display for the remote monitoring and/or controlling of a vehicle.
Figure 13:
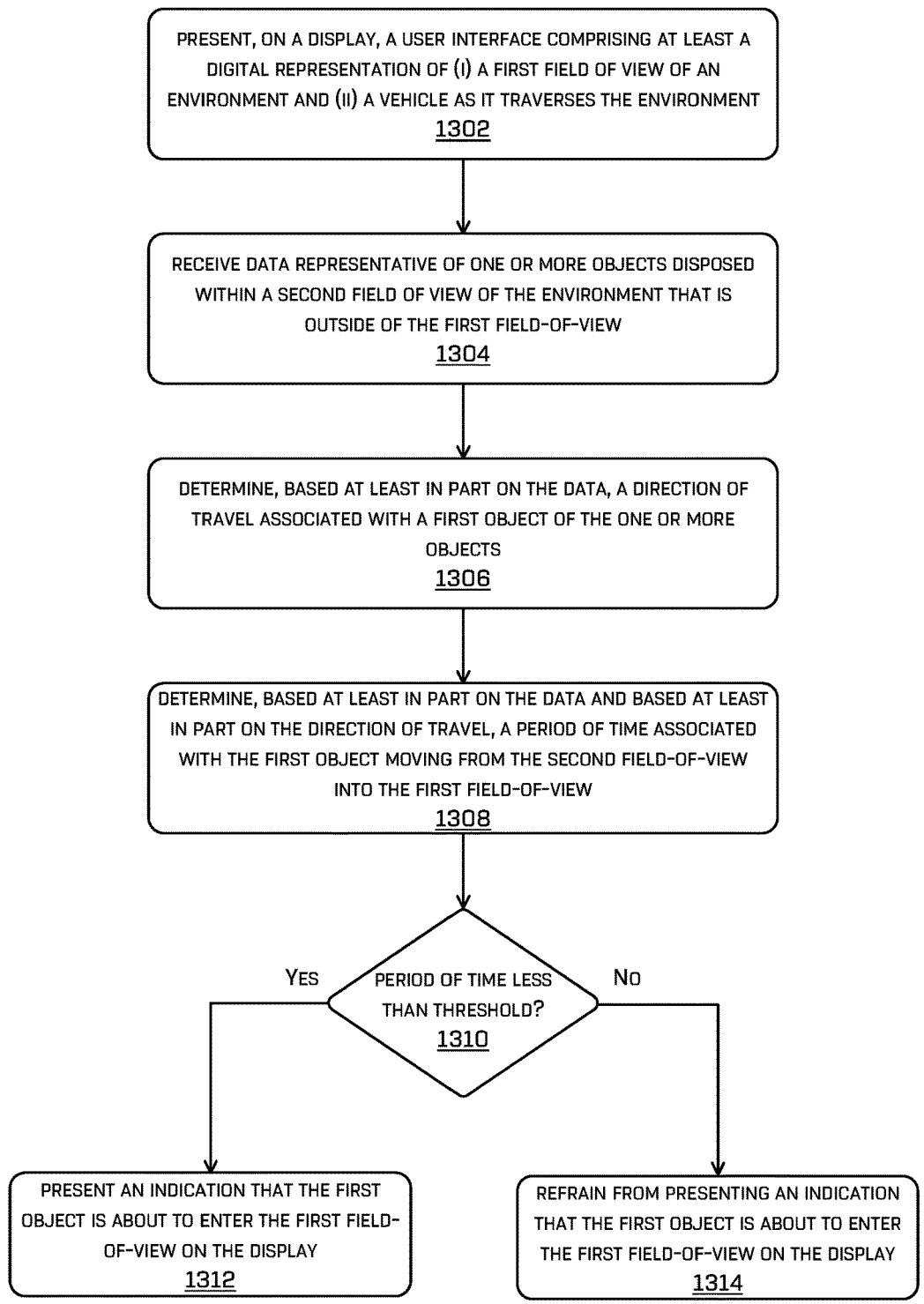

FIGS. 11-13 are flowcharts showing example methods of presenting various user interfaces on a display that are associated with remotely monitoring a vehicle. The methods illustrated in FIGS. 11-13 are described with reference to one or more of the vehicles, teleoperations systems, and user interfaces described in FIGS. 1-10 for convenience and ease of understanding. However, the methods illustrated in FIGS. 11-13 are not limited to being performed using the vehicles, teleoperations systems, and user interfaces described in FIGS. 1-10, and may be implemented using any of the other vehicles, teleoperations systems, and user interfaces described in this application, as well as vehicles, teleoperations systems, and user interfaces other than those described herein. Moreover, the vehicles, teleoperations systems, and user interfaces described herein are not limited to performing the methods illustrated in FIGS. 11-13.

The methods 1100, 1200, and 1300 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the methods 1100, 1200, and 1300 may be combined in whole or in part with each other or with other methods.

FIG. 11 is a flowchart illustrating an example method 1100 of presenting a user interface on a display for the remote monitoring and/or controlling of a vehicle. The method 1100 begins at operation 1102, which includes presenting a representation of an environment and a vehicle as it traverses the environment on a first portion of a display. For instance, the teleoperations interface 154 of the teleoperations system 148 may present the digital representation of the environment and the vehicle as it traverses the environment on a first portion of the one or more displays 156.

At operation 1104, the method 1100 includes presenting a communication interface that is configured to provide a user communication with at least a first person on a second portion of the display. For instance, the teleoperations interface 154 of the teleoperations system 148 may present the communication interface on a second portion of the one or more displays 156. Additionally, in some examples, the first person may comprise an occupant of the vehicle, remote operator of the vehicle, a pedestrian that proximate the vehicle, or any combination thereof.

At operation 1106, the method 1100 includes receiving, via a first input element of the communication interface, first data indicating that a first chat interface is to be opened. For example, a teleoperator 150 may select the first input element of the communication interface using the one or more displays 156. For instance, the one or more displays 156 may comprise a touchscreen display, or may be communicatively coupled to an input device, such as a mouse, keyboard, and the like. In some examples, the first chat interface may be associated with a first person or multiple persons. For instance, the first chat interface may be associated with a first occupant of the vehicle, or multiple occupants of the vehicle (e.g., a group chat).

At operation 1108, the method 1100 includes presenting the first chat interface on the display based at least in part on receiving the first data. For instance, the first chat interface may be presented on the one or more displays 156 of the teleoperations system 148. At operation 1110, the method 1100 includes receiving, via a second input element of the communication interface, second data representing at least a portion of a first message that is to be sent. For example, the second data may be text data that is received using the text field 508 of the communication interface 408. Additionally, the portion of the first message may comprise a single word or a combination of words of the message, such as the word "please."

At operation 1112, the method 1100 includes determining, based at least in part on the second data, whether a suggested message is to be generated. For instance, if the portion of the first message comprises a single word or a combination of words that are commonly used, the teleoperations system 148 may determine one or more suggested messages that are associated with the word or combination of words.

At operation 1114, if the suggested message is not to be generated, the method 1100 includes presenting the first message on the display within the first chat interface. For instance, if there is no suggested message and the teleoperator 150 decides to send the first message, then the first message may be presented within the first chat interface. In some examples, the first message may be presented on the one or more displays 156 within the first chat interface.

At operation 1116, if the suggested message is to be generated, the method 1100 includes presenting the suggested message on the display. For example, if the portion of the first message includes the word "please," and the teleoperations system 148 determines one or more suggested messages associated with the word "please," then the one or more suggested messages may be presented on the one or more displays 156. By way of example, and not limitation, a suggested message in this instance may include a message that reads "please allow the doors to shut," or "please exit the vehicle carefully."

At operation 1118, the method 1100 includes causing the message to be sent. For instance, the message may be sent to a device associated with an occupant of the vehicle, a pedestrian that is proximate the vehicle, an operator of the vehicle (e.g., an in-vehicle operator or another remote teleoperator), and the like. Additionally, causing the message to be sent may be based at least in part on receiving an indication that the message is to be sent. For example, the communication interface may include an input element that, when selected, causes the message to be sent.

FIG. 12 is a flowchart illustrating another example method 1200 of presenting a user interface on a display for the remote monitoring and/or controlling of a vehicle. The method 1200 begins at operation 1202, which includes presenting, on a display, a user interface comprising (i) a digital representation of a vehicle as it traverses an environment and (ii) a vehicle control interface. For instance, the display may include the one or more displays 156 and the user interface may be presented on the display by the teleoperations system 148.

At operation 1204, the method 1200 includes presenting, within the vehicle control interface, multiple input elements associated with controlling multiple components of the vehicle. For instance, the multiple input elements may include the door control input 802 and/or the temperature control input 806. At operation 1206, the method 1200 includes receiving, via an input element of the multiple input elements, first data indicating that a component or system of the multiple components or systems is to be controlled. For instance, the first data may indicate a selection of the component or system to be controlled by the teleoperator 150.

At operation 1208, the method 1200 includes presenting, on the display and based at least in part on the first data, an additional input element that is associated with controlling the component or system. For instance, if the component or system comprises a door, then the additional input element may include an element for opening and closing various doors of the vehicle. Additionally, or alternatively, if the component or system comprises a heating ventilation and air conditioning (HVAC) system, then the additional input element may include an element for adjusting the temperature of the vehicle.

At operation 1210, the method 1200 includes receiving, via the additional input element, second data indicating that a state of the component or system is to be changed from a first state to a second state. For instance, if the additional input element is associated with opening and closing a vehicle door, then changing the state of the vehicle door from a first state to a second state may comprise causing the door to change from an open position to a closed position.

At operation 1212, the method 1200 includes causing the state of the component or system to change to the second state. For instance, data may be sent to the vehicle that causes the component or system of the vehicle to change state. By way of example, if the component or system comprises a door of the vehicle, data may be sent to the vehicle that causes the door to open or close.

At operation 1214, the method 1200 includes determining whether a state of the component or system of the vehicle changed from the first state to the second state. For instance, data associated with the component or system of the vehicle, such as sensor data, may be received to indicate whether the component or system of the vehicle has changed states. By way of example, and not limitation, if the component or system of the vehicle is a door of the vehicle, then sensor data may be received indicating whether the door is open or closed. Based at least in part on this sensor data, a current state of the vehicle component or system may be determined.

At operation 1216, the method 1200 includes updating the digital representation of the vehicle to indicate that the component or system is in the second state. For instance, if the component or system comprises a door of the vehicle and sensor data is received that indicates that the door is closed, then the digital representation of the vehicle may be updated to show that the door of the vehicle is in a closed position.

FIG. 13 is a flowchart illustrating yet another example method 1300 of presenting a user interface on a display for the remote monitoring and/or controlling of a vehicle, as well as for presenting off-screen notifications on the user interface to indicate the presence of objects that the vehicle may be responding to. The method 1300 begins at operation 1302, which includes presenting, on a display, a user interface comprising at least a digital representation of (i) a first field of view of an environment and (ii) a vehicle as it traverses the environment. In some instance, the user interface may be presented on the one or more displays 156 of the teleoperations system 148.

At operation 1304, the method 1300 includes receiving data representative of one or more objects disposed within a second field of view of the environment that is outside of the first field-of-view. Additionally, or alternatively, data may be received that is representative of one or more objects that are disposed within the first field-of-view, but that are otherwise obstructed from being viewed by the teleoperator 150 using the display 156. For instance, the one or more objects may be obstructed from view by an interface region of the user interface.

At operation 1306, the method 1300 includes determining, based at least in part on the data, a direction of travel associated with a first object of the one or more objects. For instance, a trajectory may be determined for the first object. At operation 1308, the method 1300 includes determining, based at least in part on the data and based at least in part on the direction of travel, a period of time associated with the first object moving from the second field-of-view into the first field-of-view.

At operation 1310, the method 1300 includes determining whether the period of time is less than a threshold period of time. In some examples, the threshold period of time may include a predefined amount of time, such as one second, two seconds, five seconds, ten seconds, and so forth. At operation 1312, the method 1300 includes presenting an indication that the first object is about to enter the first field-of-view on the display. In some examples, presenting the indication may be based at least in part on the period of time being less than the threshold period of time.

Alternatively, at operation 1314, the method 1300 includes refraining from presenting an indication that the first object is about to enter the first field-of-view on the display. For instance, if the period of time is greater than the threshold period of time, then the method may refrain from presenting the indication.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A. A system comprising: one or more processors; and one or more computer-readable media storing instructions that, when executed by the one or more processors, cause the system to perform operations comprising: presenting, on a display, a user interface that is configured to provide a remote operator with information associated with a fleet of vehicles, the user interface comprising: a representation of an environment and a vehicle of the fleet of vehicles as it traverses the environment; and a communication interface configured to provide the remote operator communication with an occupant of the vehicle and another remote operator; receiving, via a first input element of the communication interface, first data indicating that a first chat interface of the communication interface is to be opened, the first chat interface being associated with the occupant; causing presentation of the first chat interface on the display based at least in part on receiving the first data; receiving, via a second input element of the communication interface, second data representing a first message that is to be sent to the first occupant; and based at least in part on receiving an indication that the first message is to be sent, causing the first message to be sent and presenting the first message on the display within the first chat interface.

B. The system as paragraph A recites, the operations further comprising: receiving, via a third input element of the communication interface, third data indicating that a second chat interface is to be opened, the second chat interface being associated with the other remote operator; based at least in part on receiving the third data, causing presentation of the second chat interface on the display while suppressing presentation of the first chat interface; receiving, via the second input element of the communication interface, fourth data representing a second message that is to be sent to the other remote operator; and presenting the second message on the display within the second chat interface based at least in part on receiving an indication that the second message is to be sent.

C. The system as any one of paragraphs A or B recites, wherein the user interface further comprises a vehicle control interface that provides control of a component or system of the vehicle, the operations further comprising: receiving, via a first input element of the vehicle control interface, third data indicating that the component or system of the vehicle is to be controlled; and transmitting a signal to the vehicle, the signal configured to cause the vehicle to control the component in accordance with the first input element of the vehicle control interface.

D. The system as any one of paragraphs A-C recites, the operations further comprising: receiving, via a network, a request to cause at least one of the vehicle or a component of the vehicle to perform an action; and receiving, via an input element of the user interface, third data to cause the vehicle or the component to perform the action.

E. A method comprising: presenting, on a first portion of a display, a digital representation of an environment and a vehicle as it traverses the environment; presenting, on a second portion of the display, a communication interface that is configured to provide communication with a first person; receiving, via a first input element of the communication interface, first data indicating that a first chat interface is to be opened, wherein the first chat interface is associated with the first person; presenting the first chat interface on the display based at least in part on receiving the first data; receiving, via a second input element of the communication interface, second data representing a first message that is to be sent; and based at least in part on receiving an indication that the first message is to be sent, causing the first message to be sent and presenting the first message on the display within the first chat interface.

F. A method as paragraph E recites, wherein the first person comprises an occupant of the vehicle, the method further comprising: presenting, within the communication interface, a third input element that is configured to receive user inputs indicating whether the first message is to be communicated audibly; receiving, via the third input element, third data indicating that the first message is to be communicated audibly; and wherein causing the first message to be sent comprises causing the first message to be communicated audibly within the interior of the vehicle.

G. A method as any one of paragraphs E or F recites, wherein the first person comprises a pedestrian that is proximate an exterior of the vehicle, the method further comprising: presenting, within the communication interface, a third input element that is configured to receive user inputs indicating whether the first message is to be communicated audibly; receiving, via the third input element, third data indicating that the first message is to be communicated audibly; and wherein causing the first message to be sent comprises causing the first message to be communicated audibly within the interior of the vehicle.

H. A method as any one of paragraphs E-G recites, wherein the second data comprises a string of text representing the first message, the method further comprising receiving, via a third input element, third data indicating that the first message is to be communicated audibly.

I. A method as any one of paragraphs E-H recites, wherein the second data comprises audio data representing the first message, the method further comprising receiving, via a third input element, third data indicating that the first message is to be communicated audibly.

J. A method as any one of paragraphs E-I recites, wherein the first person comprises a first occupant of the vehicle, the method further comprising: receiving, via a third input element of the communication interface, third data indicating that a second chat interface is to be opened, wherein the second chat interface is associated with a second occupant; presenting the second chat interface on the display based at least in part on receiving the third data; receiving, via the second input element of the communication interface, fourth data representing a second message that is to be sent; and presenting the second message on the display within the second chat interface based at least in part on receiving an indication that the second message is to be sent.

K. A method as any one of paragraphs E-J recites, wherein the person comprises a remote operator of the vehicle and the chat interface is configured to provide communication with the remote operator of the vehicle.

L. A method as any one of paragraphs E-K recites, wherein the first chat interface is further associated with a second person, the method further comprising: receiving, via a network and from a first device associated with the first person, third data representing a first response to the first message; presenting, on the display and within the first chat interface, the first response including a first identifier that is associated with the first person; receiving, via the network and from a second device associated with the second person, fourth data representing a second response to at least one of the first message or the first response; and presenting, on the display and within the first chat interface, the second response including a second identifier that is associated with the second person.

M. A method as any one of paragraphs E-L recites, wherein the first person comprises an occupant of the vehicle, the method further comprising: receiving, from a device associated with the occupant, a request to cause at least one of the vehicle or a component of the vehicle to perform an action; and receiving an input to cause the vehicle or the component to perform the action.

N. A method as any one of paragraphs E-M recites, further comprising presenting, on a third portion of the display, a vehicle status interface to provide information associated with a current state of the vehicle, the information including one or more of a speed of the vehicle, a direction of travel of the vehicle, or traffic rule associated with a current location of the vehicle.

O. A method as any one of paragraphs E-N recites, further comprising presenting, on a third portion of the display, a vehicle control interface that provides control of a component of the vehicle, the vehicle control interface including at least a first input element that is associated with a first component of the vehicle.

P. A method as any one of paragraphs E-O recites, wherein the first component of the vehicle comprises at least one of a door of the vehicle, a climate control system of the vehicle, or a stereo system of the vehicle, the method further comprising: receiving, via a first input element of the vehicle control interface, third data indicating that the first component is to be controlled; and transmitting a signal to the vehicle, the signal configured to cause the vehicle to control the component in accordance with the first input element of the vehicle control interface.

Q. A non-transitory computer-readable storage medium storing instructions thereon that, when executed by one or more computing devices, cause the one or more computing devices to perform operations comprising: presenting, on a first portion of a display, a representation of a vehicle as it traverses an environment; presenting, on a second portion of the display, a communication interface that is configured to provide a user communication with a first person; receiving, via a first input element of the communication interface, first data indicating that a chat interface is to be opened; presenting the chat interface on the display based at least in part on receiving the first data; receiving, via a second input element of the communication interface, second data representing a message that is to be sent; and based at least in part on receiving an indication that the message is to be sent, causing the message to be sent and presenting the message on the display within the chat interface.

R. The non-transitory computer-readable storage medium as paragraph Q recites, wherein the first person comprises a pedestrian that is proximate an exterior of the vehicle, the operations further comprising: presenting, within the communication interface, a third input element that is configured to receive user inputs indicating whether the message is to be communicated audibly; and receiving, via the third input element, third data indicating that the message is to be communicated audibly to the pedestrian.

S. The non-transitory computer-readable storage medium as any one of paragraphs Q or R recites, wherein the chat interface comprises a first chat interface that is associated with the first person, the operations further comprising: receiving, via a third input element of the communication interface, third data indicating that a second chat interface is to be opened, wherein the second chat interface is associated with a second person, the second person comprising a remote operator associated with the vehicle; presenting the second chat interface on the display while suppressing the first chat interface based at least in part on receiving the third data; receiving, via the second input element of the communication interface, fourth data representing a second message that is to be sent; and presenting the second message on the display within the second chat interface based at least in part on receiving an indication that the second message is to be sent.

T. The non-transitory computer-readable storage medium as any one of paragraphs Q-S recites, the operations further comprising: receiving, from a first device associated with the first person, third data representing a first response to the message; presenting, on the display and within the chat interface, the first response including a first identifier that is associated with the first person; receiving, from a second device associated with a second person, fourth data representing a second response to at least one of the message or the first response; and presenting, on the display and within the chat interface, the second response including a second identifier that is associated with the second person.

U. The system as any one of paragraphs A-D recites, the operations further comprising receiving, via a third input element of the communication interface, third data indicating at least one of that the first message is to be communicated audibly to the first occupant or that the first message is to be sent to a mobile device associated with the first occupant.

V. The method as any one of paragraphs E-P recites, wherein the operator of the vehicle comprises at least one of a remote operator or an operator in the vehicle.

W. The method as any one of paragraphs E-P or V recites, wherein the vehicle status interface is disposed on the first portion of the display proximate the digital representation of the vehicle, and the vehicle status interface is configured to increase in size and decrease in size depending based at least in part on at least one of the current state of the vehicle or the environment.

X. A system comprising: one or more processors; and one or more computer-readable media storing instructions that, when executed by the one or more processors, cause the one or more processors to perform operations comprising: presenting, on a display, a user interface that is configured to provide a remote operator with information associated with a fleet of vehicles, the user interface comprising: a representation of an environment and a vehicle of the fleet of vehicles as it traverses the environment; and a vehicle control interface that is configured to provide the remote operator with control of a component of the vehicle; presenting, within the vehicle control interface, an input element that is associated with controlling the component of the vehicle; receiving, via an input element of the input element, first data indicating that a component is to be controlled; causing presentation, on the display and based at least in part on the first data, of an additional input element that is associated with controlling the component; receiving, via the additional input element, second data indicating that a state of the component or system is to be changed; based at least in part on the second data, causing the state of the component to change; and based at least in part on the change of the state of the component, updating the digital representation of the vehicle to indicate a current state of the component.

Y. The system as paragraph X recites, wherein the component comprises a door of the vehicle, the first state is associated with the door being in a closed position, and the second state is associated with the door being in an open position.

Z. The system as any one of paragraphs X or Y recites, wherein the component or system comprises a climate control system of the vehicle, the first state is associated with a first temperature value, and the second state is associated with a second temperature value.

AA. The system as any one of paragraphs X-AA recites, wherein the component or system comprises at least one of a door of the vehicle, a window of the vehicle, a climate control system of the vehicle, a stereo system of the vehicle, a lighting system of the vehicle, a window shade of the vehicle, or a ride setting of the vehicle.

BB. A system comprising: one or more processors; and one or more computer-readable media storing instructions that, when executed by the one or more processors, cause the one or more processors to perform operations comprising: presenting, on a display, a user interface that is configured to provide a remote operator with information associated with a fleet of vehicles, the user interface comprising at least a digital representation of (i) a first field-of-view of an environment and (ii) a vehicle of the fleet of vehicles as it traverses the environment; receiving data representative of an object disposed within a second field-of-view of the environment that is outside of the first field-of-view; determining, based at least in part on the data, a direction of travel associated with the object; determining, based at least in part on the data, a period of time associated with the object moving from the second field-of-view and into the first field-of-view; and based at least in part on the period of time being less than a threshold period of time, causing presentation, on the display, of an indication that the object is about to enter the first field-of-view.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
one or more computer-readable media storing instructions that, when executed by the one or more processors, cause the system to perform operations comprising:
presenting, on a display, a user interface that is configured to provide a remote operator with information associated with a fleet of vehicles, the user interface comprising:
a representation of an environment and a vehicle of the fleet of vehicles as it traverses the environment; and
a communication interface configured to provide the remote operator communication with occupants in different seating locations of the vehicle and another remote operator;
receiving, via a first input element of the communication interface, first data indicating that a first chat interface of the communication interface is to be opened, the first chat interface being associated with a first seating location of the different seating locations of the vehicle, the first seating location occupied by a first occupant;
causing presentation of the first chat interface on the display based at least in part on receiving the first data;
receiving, via a second input element of the communication interface, second data representing a first message that is to be sent to the first occupant; and
based at least in part on receiving an indication that the first message is to be sent, causing the first message to be sent and presenting the first message on the display within the first chat interface.

2. The system of claim 1, the operations further comprising:
receiving, via a third input element of the communication interface, third data indicating that a second chat interface is to be opened, the second chat interface being associated with the other remote operator;
based at least in part on receiving the third data, causing presentation of the second chat interface on the display while suppressing presentation of the first chat interface;
receiving, via the second input element of the communication interface, fourth data representing a second message that is to be sent to the other remote operator; and
presenting the second message on the display within the second chat interface based at least in part on receiving an indication that the second message is to be sent.

3. The system of claim 1, wherein the user interface further comprises a vehicle control interface that provides control of a component or system of the vehicle, the operations further comprising:
receiving, via a first input element of the vehicle control interface, third data indicating that the component or system of the vehicle is to be controlled; and
transmitting a signal to the vehicle, the signal configured to cause the vehicle to control the component in accordance with the first input element of the vehicle control interface.

4. The system of claim 1, the operations further comprising:
receiving, via a network, a request to cause at least one of the vehicle or a component of the vehicle to perform an action; and
receiving, via an input element of the user interface, third data to cause the vehicle or the component to perform the action.

5. A method comprising:
presenting, on a first portion of a display, a digital representation of an environment and a vehicle as it traverses the environment;
presenting, on a second portion of the display, a communication interface that is configured to provide communication with different occupants of the vehicle seated in different seating locations of the vehicle;
receiving, via a first input element of the communication interface, first data indicating that a first chat interface is to be opened, wherein the first chat interface is associated with a first occupant and a first seating location;
presenting the first chat interface on the display based at least in part on receiving the first data;
receiving, via a second input element of the communication interface, second data representing a first message that is to be sent; and
based at least in part on receiving an indication that the first message is to be sent, causing the first message to be sent and presenting the first message on the display within the first chat interface.

6. The method of claim 5, further comprising:
presenting, within the communication interface, a third input element that is configured to receive user inputs indicating whether the first message is to be communicated audibly;
receiving, via the third input element, third data indicating that the first message is to be communicated audibly; and
wherein causing the first message to be sent comprises causing the first message to be communicated audibly within an interior of the vehicle proximate the first seating location.

7. The method of claim 5, wherein the communication interface is further configured to provide communication with a pedestrian that is proximate an exterior of the vehicle, the method further comprising:
presenting, within the communication interface, a third input element that is configured to receive user inputs indicating whether the first message is to be communicated audibly;
receiving, via the third input element, third data indicating that the first message is to be communicated audibly; and
wherein causing the first message to be sent comprises causing the first message to be communicated audibly via speakers disposed on an exterior surface of the vehicle.

8. The method of claim 5, wherein the second data comprises a string of text representing the first message, the method further comprising receiving, via a third input element, third data indicating that the first message is to be communicated audibly.

9. The method of claim 5, wherein the second data comprises audio data representing the first message, the method further comprising receiving, via a third input element, third data indicating that the first message is to be communicated audibly.

10. The method of claim 5, further comprising:
receiving, via a third input element of the communication interface, third data indicating that a second chat interface is to be opened, wherein the second chat interface is associated with a second occupant and a second seating location;

presenting the second chat interface on the display based at least in part on receiving the third data;

receiving, via the second input element of the communication interface, fourth data representing a second message that is to be sent; and presenting the second message on the display within the second chat interface based at least in part on receiving an indication that the second message is to be sent.

11. The method of claim 5, wherein the communication interface is further configured to provide communication with a remote operator of the vehicle.

12. The method of claim 5, wherein the first chat interface is further associated with a second occupant and a second seating location, the method further comprising:

receiving, via a network, third data representing a first response to the first message from the first occupant;

presenting, on the display and within the first chat interface, the first response including a first identifier that is associated with the first occupant;

receiving, via the network, fourth data representing a second response to at least one of the first message or the first response from the second occupant; and presenting, on the display and within the first chat interface, the second response including a second identifier that is associated with the second occupant.

13. The method of claim 5, further comprising:

receiving, from a device associated with at least one of the first occupant or the first seating location, a request to cause at least one of the vehicle or a component of the vehicle to perform an action; and receiving an input to cause the vehicle or the component to perform the action.

14. The method of claim 5, further comprising presenting, on a third portion of the display, a vehicle status interface to provide information associated with a current state of the vehicle, the information including one or more of a speed of the vehicle, a direction of travel of the vehicle, or a traffic rule associated with a current location of the vehicle.

15. The method of claim 5, further comprising presenting, on a third portion of the display, a vehicle control interface that provides control of a component of the vehicle, the vehicle control interface including at least a first input element that is associated with a first component of the vehicle.

16. The method of claim 15, wherein the first component of the vehicle comprises at least one of a door of the vehicle, a climate control system of the vehicle, or a stereo system of the vehicle, the method further comprising:

receiving, via a first input element of the vehicle control interface, third data indicating that the first component is to be controlled; and transmitting a signal to the vehicle, the signal configured to cause the vehicle to control the component in accordance with the first input element of the vehicle control interface.

17. A non-transitory computer-readable storage medium storing instructions thereon that, when executed by one or more computing devices, cause the one or more computing devices to perform operations comprising:

presenting, on a first portion of a display, a representation of a vehicle as it traverses an environment;

presenting, on a second portion of the display, a communication interface that is configured to provide communication with a different occupants of the vehicle seated in different seating locations of the vehicle;

receiving, via a first input element of the communication interface, first data indicating that a first chat interface is to be opened, wherein the first chat interface is associated with a first occupant and a first seating location;

presenting the first chat interface on the display based at least in part on receiving the first data;

receiving, via a second input element of the communication interface, second data representing a message that is to be sent; and based at least in part on receiving an indication that the message is to be sent, causing the message to be sent and presenting the message on the display within the first chat interface.

18. The non-transitory computer-readable storage medium of claim 17, wherein the communication interface is further configured to provide communication with a pedestrian that is proximate an exterior of the vehicle, the operations further comprising:

presenting, within the communication interface, a third input element that is configured to receive user inputs indicating whether the message is to be communicated audibly; and receiving, via the third input element, third data indicating that the message is to be communicated audibly to the pedestrian.

19. The non-transitory computer-readable storage medium of claim 17, wherein the first chat interface is a first chat interface that is associated with at least one of the first occupant or the first seating location, the operations further comprising:

receiving, via a third input element of the communication interface, third data indicating that a second chat interface is to be opened, wherein the second chat interface is associated with a remote operator associated with the vehicle;

presenting the second chat interface on the display while suppressing the first chat interface based at least in part on receiving the third data;

receiving, via the second input element of the communication interface, fourth data representing a second message that is to be sent; and presenting the second message on the display within the second chat interface based at least in part on receiving an indication that the second message is to be sent.

20. The non-transitory computer-readable storage medium of claim 17, the operations further comprising:

receiving, from a first device associated with the first occupant, third data representing a first response to the message;

presenting, on the display and within the first chat interface, the first response including a first identifier that is associated with the first occupant;

receiving, from a second device associated with a second occupant, fourth data representing a second response to at least one of the message or the first response; and presenting, on the display and within the first chat interface, the second response including a second identifier that is associated with the second occupant.

* * * * *